US012580623B2

(12) United States Patent
Zhang et al.

(10) Patent No.: US 12,580,623 B2
(45) Date of Patent: Mar. 17, 2026

(54) CHANNEL STATE INFORMATION REPORTING

(71) Applicant: ZTE Corporation, Shenzhen (CN)

(72) Inventors: Shujuan Zhang, Shenzhen (CN); Bo Gao, Shenzhen (CN); Shijia Shao, Shenzhen (CN); Zhaohua Lu, Shenzhen (CN); Minqiang Zou, Shenzhen (CN); Yong Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 373 days.

(21) Appl. No.: 18/521,738

(22) Filed: Nov. 28, 2023

(65) Prior Publication Data

US 2024/0204846 A1 Jun. 20, 2024

Related U.S. Application Data

(63) Continuation of application No. PCT/CN2022/080568, filed on Mar. 14, 2022.

(51) Int. Cl.
H04B 7/06 (2006.01)

(52) U.S. Cl.
CPC .......... H04B 7/0626 (2013.01); H04B 7/063 (2013.01); H04B 7/0632 (2013.01); H04B 7/0639 (2013.01)

(58) Field of Classification Search
CPC .... H04B 7/0626; H04B 7/063; H04B 7/0632; H04B 7/0639
See application file for complete search history.

(56) References Cited

U.S. PATENT DOCUMENTS

| 2015/0139346 A1 | 5/2015 | Ko et al. |
| 2016/0277091 A1 | 9/2016 | Kim et al. |
| 2019/0081683 A1 | 3/2019 | Liu et al. |

(Continued)

FOREIGN PATENT DOCUMENTS

| JP | 2019-503103 A | 1/2019 |
| JP | 2019-521570 A | 7/2019 |

(Continued)

OTHER PUBLICATIONS

JPO, Office Action for Japanese Application No. 2023-573385, mailed on Apr. 25, 2025, 8 pages with unofficial English translation.

(Continued)

*Primary Examiner* — Derrick V Rose
(74) *Attorney, Agent, or Firm* — Perkins Coie LLP

(57) ABSTRACT

A method of wireless communication includes determining, by a first communication device, channel state information CSI corresponding to P ports, where P is a positive integer; and transmitting, by the first communication device to a second communication device, the CSI that includes at least one set of a precoding matrix indicator PMI, Q sets of channel quality indicators CQIs, or R values of rank indicator RI. The PMI indicates $C_4$ sets of precoding matrices corresponding to $C_4$ first type of time domain units, the Q sets of CQIs corresponds to Q second type of time domain units, the R values of RI corresponds to R third type of time domain units, and Q, R, $C_4$ are positive integers.

24 Claims, 9 Drawing Sheets

400 determining, by a first communication device, channel state information CSI corresponding to $P$ ports, where $P$ is a positive integer ⌐402 transmitting, by the first communication device to a second communication device , the CSI ⌐404

(56)         References Cited

U.S. PATENT DOCUMENTS

| | | | |
|---|---|---|---|
| 2019/0327726 A1* | 10/2019 | Zhang | H04B 7/0632 |
| 2019/0349171 A1 | 11/2019 | Lee et al. | |
| 2021/0111853 A1 | 4/2021 | Onggosanusi et al. | |
| 2021/0226674 A1* | 7/2021 | Ramireddy | H04B 7/0417 |
| 2024/0348297 A1 | 10/2024 | Ramireddy et al. | |

FOREIGN PATENT DOCUMENTS

| | | |
|---|---|---|
| JP | 2020-502922 A | 1/2020 |
| JP | 6748649 B2 | 9/2020 |
| JP | 2021-536187 A | 12/2021 |
| KR | 10-2021-0076905 A | 6/2021 |
| WO | 2015074262 A1 | 5/2015 |
| WO | 2017/082634 A1 | 5/2017 |
| WO | 2017142574 A1 | 8/2017 |
| WO | 2020/052736 A1 | 3/2020 |
| WO | 2020/149706 A1 | 7/2020 |
| WO | 2020/208297 A1 | 10/2020 |
| WO | 2021038668 A1 | 3/2021 |
| WO | 2023173245 A1 | 9/2023 |

OTHER PUBLICATIONS

CIPO, Office Action for Canadian Application No. 3,221,748, mailed on May 16, 2025, 5 pages.

KIPO, Office Action for Korean Application No. 10-2023-7041112, mailed on Nov. 19, 2025, 9 pages with unofficial English translation.

JPO, Final Office Action for Japanese Application No. 2023-573385, mailed on Sep. 3, 2025, 6 pages with unofficial English translation.

CATT, "Maintenance of CSI enhancement on FDD CSI and Multi-TRP/panel Transmission," 3GPP TSG RAN WG1 Meeting #108-e, e-Meeting, Feb. 21-Mar. 3, 2022, R1-2201334.

Huawei et al. "Summary of CSI enhancements for MTRP and FDD (Round 0)," 3GPP TSG RAN WG1 Meeting #108-e, e-Meeting, Feb. 21-Mar. 3, 2022, R1-2202645.

Lenovo, "CSI enhancements for multi-TRP and FDD reciprocity," 3GPP TSG RAN WG1 #108-e, e-Meeting, Feb. 21-Mar. 3, 2022, R1-2202089.

Oppo et al. "CSI enhancements for M-TRP and FR1 FDD reciprocity," 3GPP TSG RAN WG1 #108-e, e-Meeting, Feb. 21-Mar. 3, 2022, R1-2201229.

Spreadtrum Communications, "Discussion on CSI enhancements for M-TRP and FR1 Fdd reciprocity," 3GPP TSG RAN WG1 #108-e , e-Meeting, Feb. 21-Mar. 3, 2022, R1-2201540.

Vivo, "Maintenance on MTRP CSI and partial reciprocity," 3GPP TSG RAN WG1 #108-e, e-Meeting, Feb. 21-Mar. 3, 2022, R1-2201084.

International Search Report for International Application No. PCT/CN2022/080568, Mail Date: Dec. 14, 2022. 12 pages.

Extended European Search Report for European Patent Application No. 22931285.5 mailed on Jan. 16, 2025, 13 pages.

JPO, Decision to Grant for Japanese Application No. 2023-573385, mailed on Jan. 15, 2026, 4 pages with unofficial English translation.

* cited by examiner

400

402 determining, by a first communication device, channel state information CSI corresponding to $P$ ports, where $P$ is a positive integer

404 transmitting, by the first communication device to a second communication device , the CSI

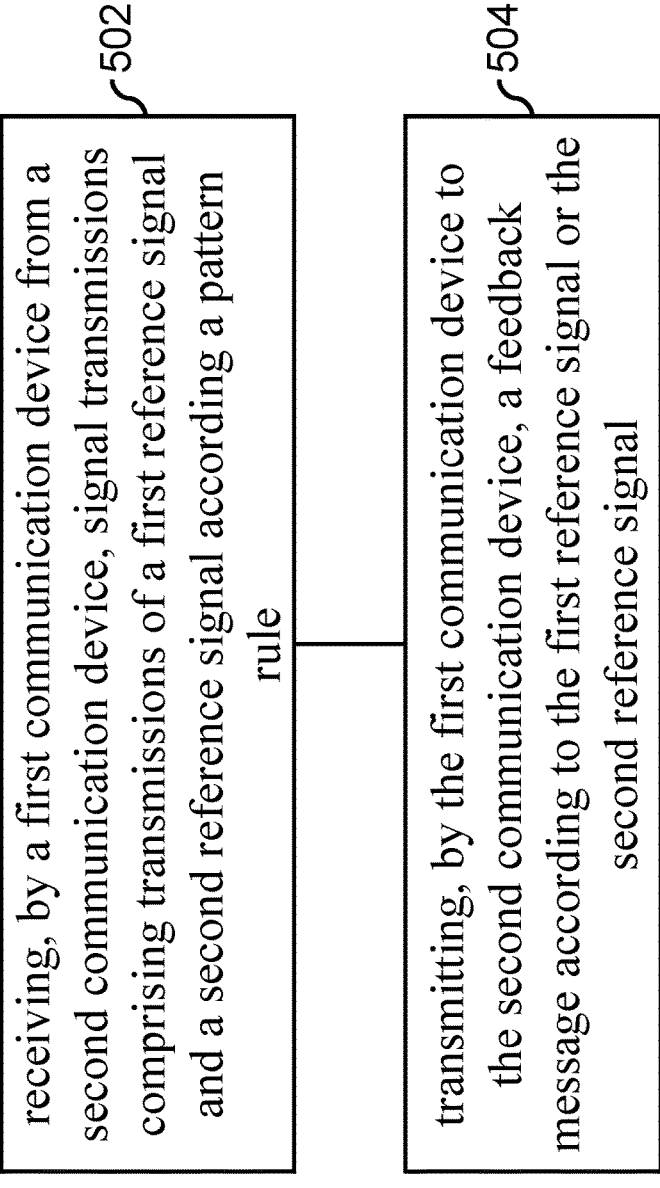

500

502 receiving, by a first communication device from a second communication device, signal transmissions comprising transmissions of a first reference signal and a second reference signal according a pattern rule

504 transmitting, by the first communication device to the second communication device, a feedback message according to the first reference signal or the second reference signal

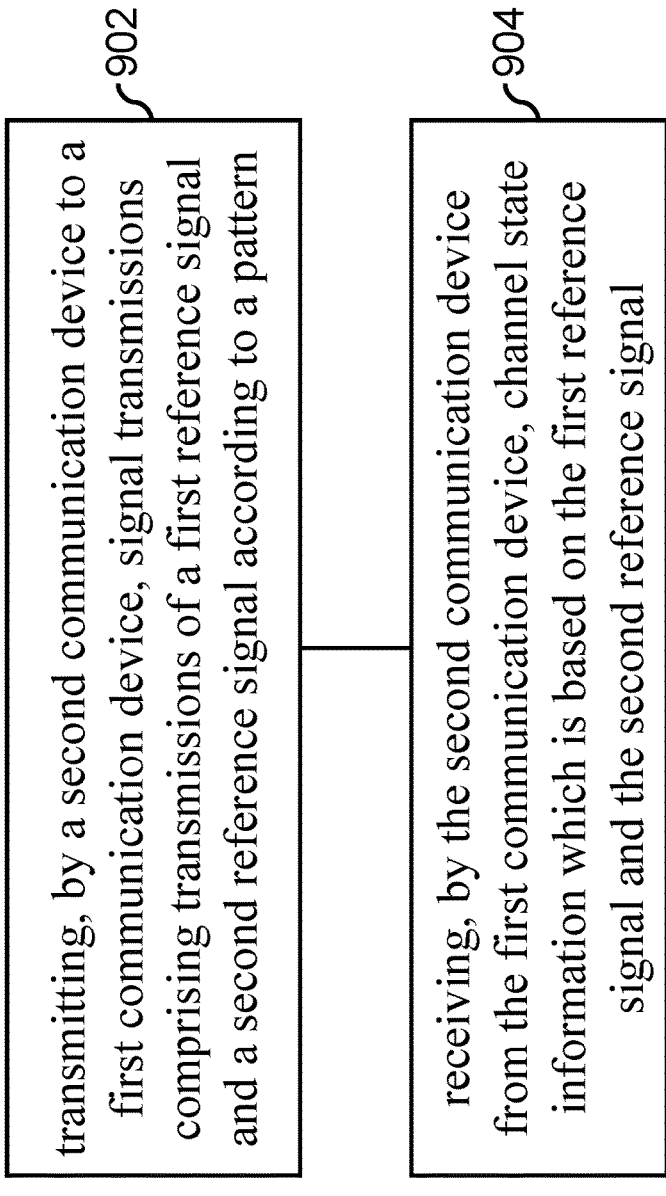

900 transmitting, by a second communication device to a first communication device, signal transmissions comprising transmissions of a first reference signal and a second reference signal according to a pattern

902 receiving, by the second communication device from the first communication device, channel state information which is based on the first reference signal and the second reference signal

CHANNEL STATE INFORMATION REPORTING

CROSS REFERENCE TO RELATED APPLICATIONS

This patent document is a continuation of and claims benefit of priority to International Patent Application No. PCT/CN2022/080568, filed on Mar. 14, 2022. The entire content of the before-mentioned patent application is incorporated by reference as part of the disclosure of this application.

TECHNICAL FIELD

This document is directed generally to wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G is committed to supporting higher data-rates, large number of connections, ultra-low latency, high reliability and other emerging business needs.

SUMMARY

Methods, apparatuses and computer readable media are described. The disclosed techniques may be used by embodiments for receiving reference signals or providing a feedback report based on received reference signals.

In one example aspect, a wireless communication method is disclosed. The method includes determining, by a first communication device, channel state information CSI corresponding to P ports, where P is a positive integer; and transmitting, by the first communication device to a second communication device, the CSI that includes at least one set of a precoding matrix indicator PMI, Q sets of channel quality indicators CQIs, or R value of rank indicator RI. The PMI indicates $C_4$ sets of precoding matrices corresponding to $C_4$ first type of time domain units, the Q sets of CQIs corresponds to Q second type of time domain units, the R values of RI corresponds to R third type of time domain units, and Q, R, $C_4$ are positive integers.

In another aspect, another method is disclosed. The method includes receiving, by a first communication device from a second communication device, signal transmissions comprising transmissions of a first reference signal and a second reference signal according to a pattern and transmitting, by the first communication device to the second communication device, channel state information according to the first reference signal and the second reference signal.

In yet another example aspect, another wireless communication method is disclosed. The method includes receiving, by a second communication device from a first communication device, the CSI that includes at least one set of a precoding matrix indicator PMI, Q sets of channel quality indicators CQIs, or R value of rank indicator RI. The PMI indicates $C_4$ sets of precoding matrices corresponding to $C_4$ first type of time domain units, the Q sets of CQIs corresponds to Q second type of time domain units, the R values of RI corresponds to R third type of time domain units, and Q, R, $C_4$ are positive integers.

In another aspect, another method is disclosed. The method includes transmitting, by a second communication device to a first communication device, signal transmissions comprising transmissions of a first reference signal and a second reference signal according to a pattern and receiving, by the second communication device from the first communication device, channel state information which is got by the first communication device according to the first reference signal and the second reference signal.

In yet another aspect, a wireless communication apparatus is disclosed. The apparatus includes a processor configured to implement a disclosed method.

In yet another aspect, a computer readable medium having program code stored thereon is disclosed. The program code, upon execution by a processor, causes the processor to implement a method disclosed in the present document.

These, and other, aspects are described throughout the present document.

BRIEF DESCRIPTION OF THE DRAWINGS

FIG. 5 is a flowchart for an example method of wireless communication.

FIG. 9 is a flowchart for an example method of wireless communication.

DETAILED DESCRIPTION

Figure 1:
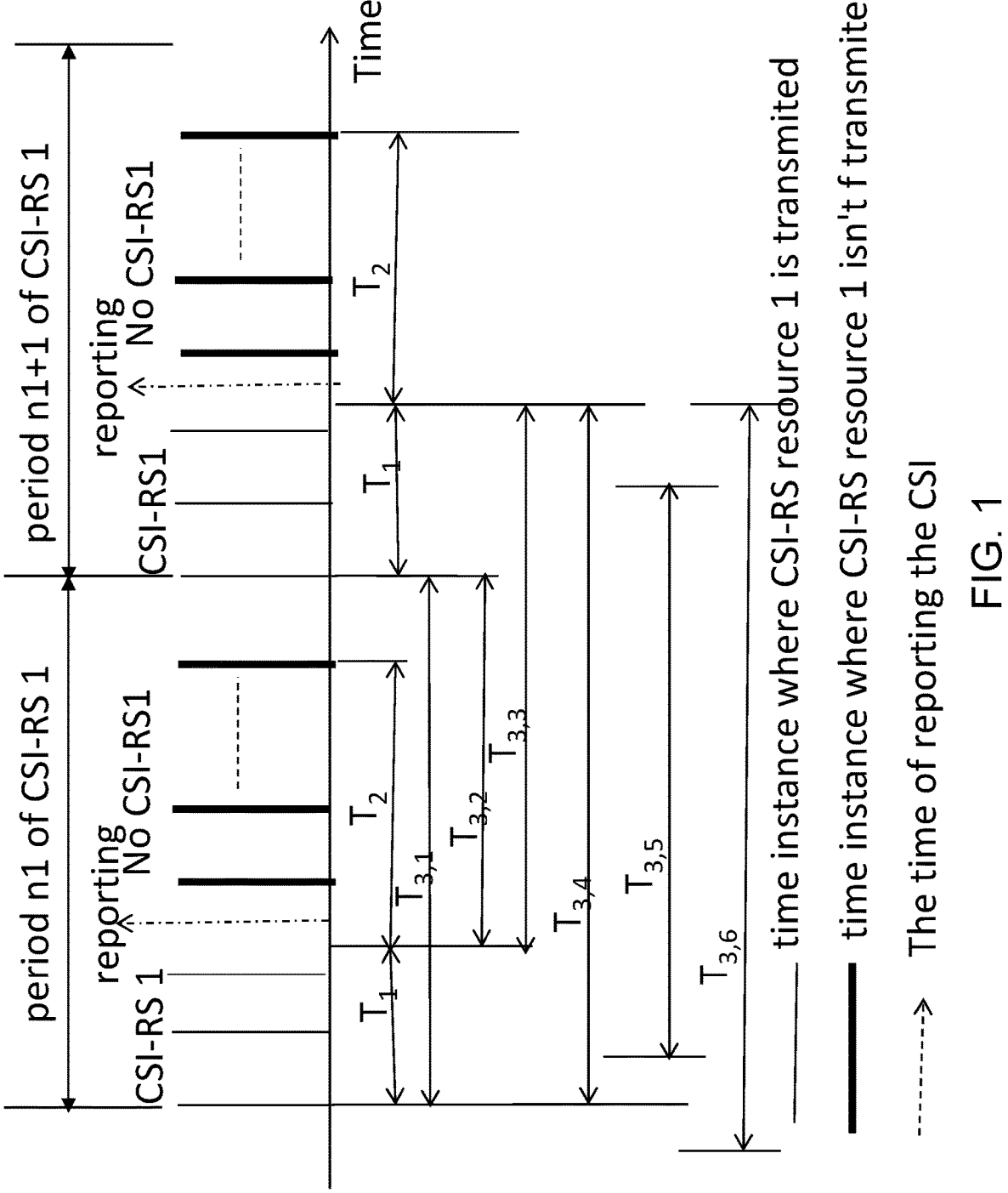
FIG. 1-2 are timing diagrams depicting example of one or more transmission occasions of channel state information (CSI) reference signal and time duration of the CSI.

In the following description, headings may be used to improve clarity without limiting the combinations of the various disclosed features. Furthermore, terminology specific to certain industry standards (e.g., 3GPP, LTE or 5G) is used for ease of explanation only and the disclosed techniques may be used in other wireless systems implementing different communications protocols.

Last few years have seen a steady growth in the number of wireless devices deployed in wireless communication networks. More and more, users are expecting availability of high bandwidth communication connections in many settings including during high-speed travel. Existing wireless communication standards are finding it difficult to provide high quality of service and meet user expectations in scenarios in which wireless communication channel between network-side device and user devices (sometimes called user equipment UE) may be unreliable or fast-changing due to high-speed movement of user devices during use.

The present document provides various techniques that, in one example aspect, may be used for transmission, reception or processing of reference signals that allows wireless devices to adapt quickly to the time-varying nature of a wireless communication channel and providing reliable and high quality wireless connectivity to user devices. The wireless device feedback one set of PMI (precoding matrix indicator). The one set of PMI indicate $C_4$ set of precoding matrices corresponding to $C_4$ first type of time domain units. The one set of PMI applies for each precoding matrix of $C_4$ set of precoding matrices. It captures the frequency domain feature and time domain feature of the channel. All precoding matrices share same information indicated by the one set of PMI. It reduces overhead of CSI and the second communication device can get more accurate CSI. The present document also reports RI/CQI for multiple time domain units in one CSI-reporting. It allows the second communication device to schedule with high flexibility based on the reported CSI Example 1

The UE determines P of CSI-RS ports according to at least one of a received signaling, or reported CRI (CSI-RS resource indicator). The UE measures the P of CSI-RS ports and gets CSI (channel state information) based on the measurement. The UE reports the determined CSI to gNB. P is the number of CSI-RS ports. The CSI includes at least one of Q sets of CQI (channel quality indicator), R values of RI (rank indicator), or one set PMI (precoding matrix indicator). Following is the procedure of determining CSI.

The Q sets of CQI are for Q second type of time domain units. Each of the Q sets is for one of the Q second type of time domain units. The R values of RI correspond to R third type of time domain units. Each of the R values of RI corresponds to one of the R third type of time domain units The one set of PMI indicates $C_4$ sets of precoding matrices for $C_4$ first type of time domain units. Each of the $C_4$ sets of precoding matrices correspond to one of the $C_4$ first type of time domain units. Each of the $C_4$ sets of precoding matrices includes $N_3$ precoding matrices. In another implementation, the number of precoding matrices in different sets of the $C_4$ sets of precoding matrices can be different. For example, the number of precoding matrices in a precoding matrix set corresponds to one first type of time domain unit including at least one of transmission occasion of the P CSI-RS ports is larger than the number of precoding matrices in a precoding matrices set corresponds to one first type of time domain unit including no transmission of the P CSI-RS ports. The CSI is for one CSI reporting.

Figure 2:
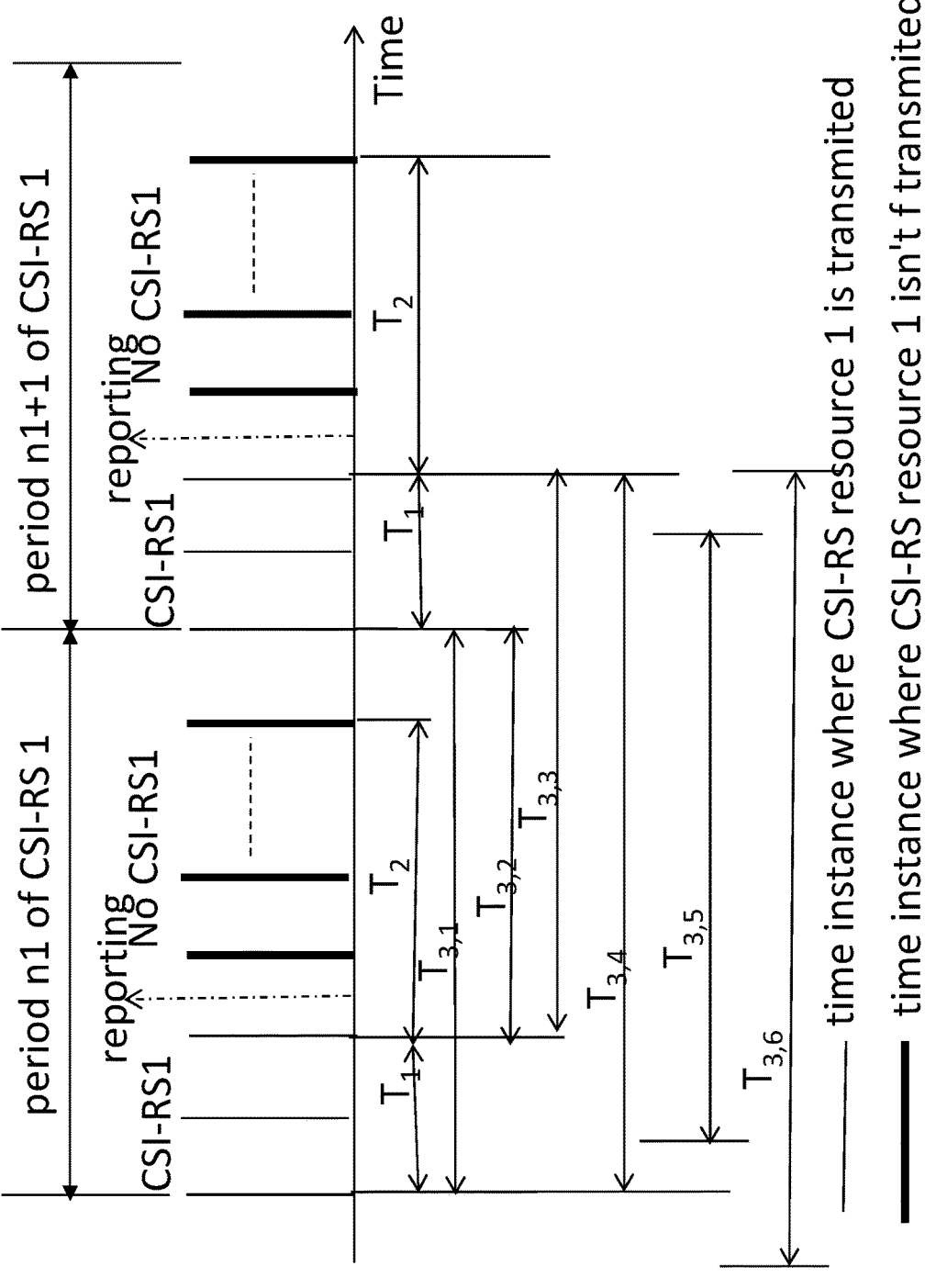

As shown in FIG. 1 or FIG. 2, there are $C_1$ CSI-RS transmission occasions of the P of CSI-RS ports during $T_1$. The UE gets channel $h_t$ on each occasion $t=0,1,\ldots,C_1$ of the $C_1$ CSI-RS transmission occasion for each first frequency domain unit $k_1=0,1,\ldots N_4-1$, wherein $h_t$ includes R rows and P columns. R is the number of receiving antennas at the UE side. Then the UE gets $H_{k_1}=\lfloor h_0\ h_1\ \ldots\ h_{C_1-1}\rfloor$ for each first frequency domain unit $k_1=0,1,\ldots N_4-1$. The UE gets a precoding matrix for each second frequency domain unit $k=0,1,\ldots N_3-1$ and for each first type of time domain unit belong to a set of $C_4$ first type of time domain units, for example $C_4=C_3$ and $t=0,1,\ldots,C_3$ during $T_3$ based on $N_4$ of $H_{k_1}$. $T_3$ can be one of $T_{3,1}, T_{3,2}\ T_{3,3}\ T_{3,4}, T_{3,5}, T_{3,6}$ or $T_1$ has shown in FIG. 1 or FIG. 2. $T_{3,1}$ equals one period of CSI-RS resource 1 including the P of CSI-RS ports and starts from a first OFDM symbol of a slot wherein the first symbol of a burst of CSI-RS resource 1 locates, or starts from the first OFDM symbol of the first transmission occasion of CSI-RS resource 1 in a burst. T32 equals one period of CSI-RS 1 minus $T_1$ which equals time duration of a burst of CSI-RS 1. The length of $T_{3,3}$ also equals to one period of CSI-RS 1 but it starts from a symbol after the end of a burst of CSI-RS 1. $T_{3,4}$ equals to one period of CSI-RS 1 plus one burst of the CSI-RS 1 in adjacent period. The duration of $T_{3,5}$ is smaller or equal to $T_{3,4}$. The gNB can informs its starting position and/or length of $T_{3,5}$. The starting OFDM symbol of $T_{3,6}$ is before the first OFDM symbol of a slot wherein the first symbol of a burst of CSI-RS resource 1 locates, or before the first OFDM symbol of the first transmission occasion of CSI-RS resource 1 in a burst of the first OFDM symbol. The gNB can also inform information about the time duration $T_3$ of the reported CSI by signaling. For example, the gNB informs starting position and/or length of the time duration $T_3$. One period of CSI-RS 1 includes one burst. One burst includes one or more transmission of CSI-RS1. There are $C_1$ transmission occasions of CSI-RS 1 in one burst of CSI-RS 1. The CSI-RS 1 is simple name of CSI-RS resource 1 including the P of CSI-RS ports. One period of the P CSI-RS ports includes one burst. One burst includes one or more transmission of the P CSI-RS ports. There are $C_1$ transmission occasions of the P CSI-RS ports in one burst of CSI-RS 1. The first frequency domain unit can be same or different from the second frequency domain unit. $N_3 \geq N_4$. The difference between FIG. 1 or FIG. 2 is the ending position of $T_1$. There is no first type of time domain unit of the $C_3$ first type of time domain units $t=0,1,\ldots,C_3$ between the end of the CSI-RS burst and the start of $T_2$ in FIG. 1 or FIG. 2. The ending position of $T_1$ can be last transmission occasion of one CSI-RS burst or end of a slot where the last occasion of one CSI-RS burst locates. The last transmission occasion of the P CSI-RS ports of the n1 period belongs to $T_1$ of the n1 period instead of $T_2$ of the n1 period.

For each second frequency domain unit $k=0,1,\ldots N_3-1$ and for each a first type of time domain unit $t=0,1,\ldots,C_3$, the UE gets a precoding matrix. These $N_3 * C_3$ precoding matrices are based on three types of vector sets. The first type of vector set includes L first type of vectors each of which includes $$\frac{P}{2}$$

elements, wherein the $$\frac{P}{2}$$

elements have same amplitude and each of the $$\frac{P}{2}$$

elements has a respective phase, or only one of $$\frac{P}{2}$$

elements has value 1 and remaining $$\frac{P}{2} - 1$$

elements have value 0. The PMI indicate one first type of vector set which shared by all layers. The PMI indicates one or v second type of vector sets. If it indicates one second type of vector set, the set is shared by all layers. If it indicates v second type of vector sets, each of the v second type of vector sets corresponds to one layer of v layers. v is indicated by the gNB, or reported by the gNB. If the CSI includes R values of RI(rank indicator), the v is one of the first value of the R values of RI, the maximal value of the R values corresponds to time duration $T_1$. Each second type of vector set includes M second type of vectors each of which includes $N_3$ elements each of which corresponds to one frequency domain unit K (i.e., the second frequency domain unit). In some implementation, different of the second type of vector sets can includes different number of second type of vectors. The PMI indicates D third type of vector sets, wherein D is larger than 1. Each of D third type of vector set includes X third type of vectors each of which includes $C_3$ elements, wherein each of the $C_3$ elements corresponds to one first type of time domain unit t. L, M and X is an integer larger than 0. In some implementation, the sum of L, M or X should be larger than 1. In some implementation, the L should be larger than 1. L, M and X is based on at least one of received signaling, P, the total number of layers v, $C_3$, or $N_3$. In some implementation, the L should be larger than 1, the sum of L, M or X should be larger than 4. In some implementation, the L should be larger than 1, the sum of M and X should be larger than 1.

In some implementation, L≤X≤M. In some implementation, the X is larger than 2. In some implementation, above restriction about L, M or X applies L, M and X of each layer. Each of the $N_3*C_3$ precoding matrices are determined according to the one set of first type of vector set, the one or v second type of vector sets, and the D third type of vector sets. Each of the v second type of vector sets is used to determine a column of each of the $N_3*C_3$ precoding matrices and the column corresponds to one layer of the v layers.

The $l^{th}$ column $W_{k,t}^{l}$ of one precoding matrix $W_{k,t}$ of the $N_3*C_3$ for each second frequency domain unit k=0,1, . . . $N_{3-1}$, for each a first type of time domain unit t=0,1, . . . , $C_3$, and for each layer l=0,1 . . . ,v−1 has one of format shown in formula (1 to 4)

$$W_t^l = \begin{bmatrix} \sum_{i=0}^{L-1} v_i \sum_{f=0}^{M-1} y_{k,l}^{(f)} \sum_{x=0}^{X-1} s_t^x a_{l,i,f,x} \\ \sum_{i=0}^{L-1} v_i \sum_{f=0}^{M-1} y_{k,l}^{(f)} \sum_{x=0}^{X-1} s_t^x a_{l,i+L,f,x} \end{bmatrix} \quad (1)$$

$$W_t^l = \begin{bmatrix} \sum_{i=0}^{L-1} v_i \sum_{f=0}^{M-1} y_{k,l}^{(f)} \sum_{x=0}^{X-1} s_{l,t}^x a_{l,i,f,x} \\ \sum_{i=0}^{L-1} v_i \sum_{f=0}^{M-1} y_{k,l}^{(f)} \sum_{x=0}^{X-1} s_{l,t}^x a_{l,i+L,f,x} \end{bmatrix} \quad (2)$$

$$W_t^l = \begin{bmatrix} \sum_{i=0}^{L-1} v_i \sum_{f=0}^{M-1} y_{k,l}^{(f)} \sum_{x=0}^{X-1} s_{l,f,t}^x a_{l,i,f,x} \\ \sum_{i=0}^{L-1} v_i \sum_{f=0}^{M-1} y_{k,l}^{(f)} \sum_{x=0}^{X-1} s_{l,f,t}^x a_{l,i+L,f,x} \end{bmatrix} \quad (3)$$

-continued $$W_t^l = \begin{bmatrix} \sum_{i=0}^{L-1} v_i \sum_{f=0}^{M-1} y_{k,l}^{(f)} \sum_{x=0}^{X-1} s_{l,i,f,t}^x a_{l,i,f,x} \\ \sum_{i=0}^{L-1} v_i \sum_{f=0}^{M-1} y_{k,l}^{(f)} \sum_{x=0}^{X-1} s_{l,i,f,t}^x a_{l,i+L,f,x} \end{bmatrix} \quad (4)$$

wherein $v_i, i \in \{0,1, \ldots, L-1\}$ is the first type of vector in the first type of vector set, $y_{k,l}^{(f)}$ is $k^{th}$ element of a second type of vector with index f in the second type of vector set, $s_{l,t}^x$, $s_{l,f,t}^x$ and $s_t^x$, $S_{l,i,f,t}^x$ are an element associated with t of a third type of vector with index x in the third type of vector set. The phase and amplitude of $a_{l,i,f,j}$ should be feedback to gNB. The amplitude of $a_{l,i,f,j}$ is smaller than or equals to 1.

The one set of PMI includes at least one of: information about the one of first type of vector set, information about the one or v the second vector sets, information about the D third type of vector sets, information about $a_{l,i,f,j}, i \in \{0,1, \ldots, 2L-1\}$ (e.g., the weighted coefficients).

In some implementation, the first type of vector $v_i$ can be got according to following formula $$u_m = \begin{cases} \left[ 1 \quad e^{j2\pi\frac{m}{N_1 O_1}} \quad e^{j2\pi\frac{2m}{N_1 O_1}} \quad \ldots \quad e^{j2\pi\frac{m(N_1-1)}{N_1 O_1}} \right], & \text{if } N_1 > 1 \\ 1, & \text{if } N_1 = 1 \end{cases} \quad (5)$$

$$v_{e,m} = \left[ u_m \quad u_m e^{j2\pi\frac{e}{N_1 O_1}} \quad u_m e^{j2\pi\frac{2e}{N_1 O_1}} \quad \ldots \quad u_m e^{j2\pi\frac{e(N_1-1)}{N_1 O_1}} \right] \quad (6)$$

The information about the one first vector set includes the index of e, m for each i=0,1, . . . ,L−1. For example, $e_i = O_1 n_{1,i} + q_1, n_{1,i} \in \{0,1, \ldots N_1-1\}$, $q_1 \in \{0,1, \ldots O_1-1\}$, $m_i = O_2 n_{2,i} + q_2, n_{2,i} \in \{0,1, \ldots N_2-1\}, q_2 \in \{0,1, \ldots, O_2-1\}$ for $v_i$, wherein $v_i = v_{e_i, m_i}$. The PMI of the one first vector set includes information of $n_{1,i}, n_{2,i}$ for each i=0,1, . . . ,L−1 and information about $q_1, q_2$ which are same for all i.

In some implementation, only one element with index $$m_i \bmod \frac{P}{2}$$

of $v_i$ is value 0, remaining $$\frac{P}{2} - 1$$

elements are value 0, the CSI includes information about $$m_i \in \left\{0, 1, \ldots, \frac{P}{2} - 1\right\}$$

for each $v_i, i=0,1, \ldots L-1$.

In some implementation, one second frequency domain unit includes one subband or half of one subband, a second type of vector $Y_l^f$ has following format $$Y_l^f = \left[1, e^{j2\pi\frac{n_{3,l}^f}{N_3}}, e^{j2\pi\frac{2n_{3,l}^f}{N_3}}, \ldots, e^{j2\pi\frac{n_{3,l}^f k}{N_3}}, \ldots, e^{j2\pi\frac{n_{3,l}^f(N_3-1)}{N_3}}\right]^T,$$

$n_{3,l}{}^f \in \{0,1, \ldots , N_3 - 1\}$. The $$y_{kl}^{(f)} = e^{j\frac{2\pi n_{3,l}^{f} k}{N_3}}$$

is $k^{th}$ element of the second vector $Y_l^f$. The information about one second vector set included in the CSI includes information about $n_{3,l}{}^f$ for each second type of vector in the second vector set. In some implementation, the information about the second vector set included in the CSI doesn't include absolute $n_{3,l}{}^f$ for each second type of vector in the second vector set. It includes $n_{3,l}{}^f$ after remapping $n_{3,l}{}^f = (n_{3,l} - n_{3,l}{}^{f*})$ mod $N_3$ and it only includes $n_{3,l}{}^f$ for M−1 second type of vectors in the second vector set and it doesn't includes $n_{3,l}{}^f$ for a second vector with $n_{3,l}{}^{f*} = 0$ after remapping. In some implementation, the second vector set is specific to one layer. The CSI includes information about a second vector set for each layer. That is the CSI includes v second type of vector sets. Each of the v second type of vector sets is used to determine a column of each of the $N_3 * C_3$ precoding matrices. Different layers respectively corresponds to one piece of information about a second type of vector set and different layers respectively corresponds to different second vector sets. In another implementation, the second type of vector set are shared by all layers. The CSI includes information about the one second type of vector set shared by all layers, then $y_{k,l}{}^{(f)}$ in formula (1-3) can be replace with $y_k{}^{(f)}$. $Y_l^f$ can be replaced with $Y^f$.

In some implementation, each first type of time domain unit includes one OFDM symbol, t is index of OFDM symbol index during $T_3$.

In some implementation, each first type of time domain unit includes one or more OFDM symbols, t is index of OFDM symbol group index during $T_3$, that is t is the index of the first type of time domain unit. One OFDM symbol group corresponds to one first type of time domain unit. Different first type of time domain units with different index t include same or different number of OFDM symbols.

In some implementation, one first type of time domain unit includes up to one transmission occasion of the P of CSI-RS ports.

In some implementation, one first type of time domain unit includes to one or more slots.

In some implementation, the period of reporting the CSI is equals to period of the P of CSI-RS ports. For example, the period of reporting the CSI can be not configured. It equals to the period of the P CSI-RS. Time where PUSCH/PUCCH (physical uplink shared channel or a physical uplink control channel) including the CSI including PMI is located is based on the position of the last transmission occasion of the P CSI-RS ports of one burst. It is after the last transmission occasion of the P of CSI-RS ports of one burst as shown in FIG. 1 or FIG. 2. The gNB can inform gap between the last transmission occasion of the P of CSI-RS ports of one burst and starting time where PUSCH/PUCCH including the CSI is located. The information about the gap includes at least one of a quantity of slot, or a quantity of OFDM symbol.

In some implementation, the number of OFDM symbols in one first type of time domain unit depends on at least one of the number OFDM symbols in one CSI-RS 1 transmission occasion, or the OFDM symbol gap between the starting OFDM symbol and the ending OFDM symbol of one CSI-RS1 transmission occasion, maximal of $C_1$ OFDM symbol gaps each of which is OFDM symbol gap between the starting OFDM symbol and the ending OFDM symbol of one CSI-RS1 transmission occasion of $C_1$ CSI-RS1 transmission occasion, received value, $F_x$, $f_x$ a maximal value of $F_x$, a maximal value of $f_x$, a value reported by the UE, or a capability reported by the UE, wherein $F_x$ is doppler shift(or doppler spread) associated with a third type of vector with index x and the unit of $F_x$ is Hz, the unit of $f_x$ is 1 or one sub carrier space. For example, the number of OFDM symbols in one first type of time domain unit is equal to or larger than at least one of the number OFDM symbols in one CSI-RS 1 transmission occasion, or the OFDM symbol gap between the starting OFDM symbol and the ending OFDM symbol of one CSI-RS1 transmission occasion, or the maximal of $C_1$ OFDM symbol gaps.

Each third type of vector is based on at least one of doppler frequency shift $F_x$, $f_x$ sub-carrier space $\Delta f$, or length of a OFDM symbols. For example, any one of the time-domain vector $s_t{}^x$, $s_{l,t}{}^x$, $s_{l,f,t}{}^x$, $S_{l,i,f,t}{}^x$ (e.g., the third type of vector) for a first type of time domain unit t can have at least one of following formats:

Alt1:

$$s_{f,t}^x = e^{j2\pi F_x \frac{n_{3,l}^{(f)}}{N\Delta f} + j2\pi F_x t T_{OFDM}},$$

x=0,1, . . . X−1, f=0,1, . . . ,M−1,then the time-domain vector are based on parameter $n_{3,l}{}^f$ of frequency domain vector (e.g., the second type of vector). In addition, because the reported $n_{3,l}{}^f$ for the second type of vector with index f is a value after remapping, that is the reported $n_{3,l}{}^f = n_{3,l,a}{}^f$ wherein $n_{3,l,a}{}^f = (n_{3,l,b}{}^f - n_{3,l,b}{}^{f*})$mod $N_3$. But if $n_{3,l}{}^f$ used to generate the third type of vector is a value before remapping $n_{3,l,b}{}^f$, the third type of vector can match well with $F_x$ especially when $F_x$ is larger. For example the relationship between the third type of vector $S_{f,t,b}{}^x$ using $n_{3,l,b}{}^f$ value before remapping and the third type of vector $s_{f,t,a}{}^x$ using $n_{3,l,b}{}^f$ value after remapping has following format $$s_{f,t,a}^x = e^{j2\pi f_x \frac{n_{3,l,b}^{(f)} - n_{3,l,b}^{(f*)}}{N} + j2\pi F_x t T_{OFDM}} = e^{-j2\pi f_x n_{3,l,b}^{(f*)}} s_{f,t,b}^x, x = 0, 1, \ldots X - 1$$

$$s_{f,t,b}^x = e^{j2\pi f_x \frac{n_{3,l,b}^{(f)}}{N} + j2\pi F_x t T_{OFDM}}.$$

$S_{f,t,a}{}^x$ adds a new factor $e^{-j2\pi F_x n_{3,l}^{(f*)}}$ compared with $s_{f,t,b}{}^x$ which matches the channel better. If we use $n_{3,l}{}^f$ after remapping to generate the third type of vector, such as $S_{l,f,t}{}^x = S_{l,f,t,a}{}^x$. The factor $e^{-j2\pi F_x n_{3,l}^{(f*)}}$ need $a_{l,i,f,x}$ to offset. It increases the number of bits for reporting $a_{l,i,f,x}$ especially when $F_x$ is large. So the $n_{3,l}{}^f$ before remapping should be reported. For example, the UE reports one value $n_{3,l,b}{}^{f*} \in \{0,1, \ldots , N_3 - 1\}$, $f^* = 0$ before remapping and M−1 values $n_{3,l,a}{}^f \in \{0,1, \ldots ,N_3 - 1\}$, f=1, . . . ,M−1 after remapping. $n_{3,l}{}^f$ corresponds to strongest value of $a_{l,i,f,x}$. Then the $n_{3,l,b}{}^f = (n_{3,l,a}{}^f + n_{3,l,b}{}^{f*})$ mod $N_3$, f=0,1, . . . ,M−1, the value before remapping is used to generate the third type of vector. That is $s_{l,f,x} = s_{l,f,x,b}$. The value before remapping or the value after remapping is used to generate the second type of vector. The second type of vector using a value before remapping and the second type of vector using a value after remapping is same in terms of performance. In another implementation, the UE reports M values $n_{3,l,b}{}^f \in \{0,1, \ldots ,N_3 - 1\}$, f=0, . . . ,M−1 before remapping. The M $n_{3,l,b}{}^f$ value can be directly used to generate the second type of vector and the third type of vector. But the strongest value of $a_{l,i,f,x}$ doesn't always correspond to f=0. The f corresponding to the strongest value of $a_{l,i,f,x}$ should be feedback to gNB by the UE. The remapping operation refers to $n_{3,l,a}{}^f = (n_{3,l,b}{}^f - n_{3,l,b}{}^{f^*})$ mod $N_3$.

Alt 2: $s_t{}^x$ isn't specific to each second type of vector because only one $n_{3,l}{}^f$ is used to determine the third type of vector. Then $s_{f,t}{}^x$ is replaced with $s_f{}^x$.

$$s_t^x = e^{j2\pi f_x \frac{n_{3,l}^{(f^{**})}}{N} + j2\pi F_x t T_{OFDM}},$$

x=0,1, . . . X−1, wherein $n_{3,l}{}^{f^{**}}$ is one of $$n_{3,l,b}^{f^*}, \max_f n_{3,l,b}^f, \max_f n_{3,l,a}^f, n_{3,l,a}^{f^*}, \frac{1}{M}\sum_{f=0}^{M-1} n_{3,l,a}^f,$$

$$\text{or } \frac{1}{M}\sum_{f=0}^{M-1} n_{3,l,b}^f.$$

Alt3: $s_t{}^x = e^{j2\pi F_x t T_{OFDM}}$, x=0,1, . . . , X−1

Alt4:

$$s_{f,t}^x = e^{\frac{j2\pi f_x\left(n_{3,l}^{(f)} + t(N+CP)\right)}{N}},$$

x=0,1 . . . , X−1, f=0,1, . . . M−1, wherein $n_{3,l}{}^f$ is one of $n_{3,l,b}{}^f$ which is a value before remapping or $n_{3,l,a}{}^f$ which is a value after remapping as done in Alt1.

Alt5:

$$s_t^x = e^{\frac{j2\pi f_x t(N+CP)}{N}},$$

x=0,1 . . . , X−1

Alt6:

$$s_{f,t}^x = e^{j2\pi F_x \frac{n_{3,l}^{(f)}}{N_3} + j2\pi F_x t T_{OFDM}},$$

x=0,1, . . . X−1, f=0,1, . . . , M−1

Alt7:

$$s_t^x = e^{j2\pi F_x \frac{n_{3,l}^{(f^{**})}}{N_3} + j2\pi F_x t T_{OFDM}},$$

x=0,1, . . . X−1

Alt8:

$$s_{f,t}^x = e^{\frac{j2\pi f_x\left(Nn_{3,l}^{(f)}/N_3 + t(N+CP)\right)}{N}},$$

x=0,1 . . . , X−1

Alt9:

$$s_t^x = e^{\frac{j2\pi f_x\left(n_{3,l}^{(f^{**})} + t(N+CP)\right)}{N}},$$

x=0,1 . . . , X−1,wherein $n_{3,l}{}^{f^{**}}$ is one of $$n_{3,l,b}^{f^*}, \max_f n_{3,l,b}^f, \max_f n_{3,l,a}^f,$$

$$n_{3,l,a}^*,$$

$$\frac{1}{M}\sum_{f=0}^{M-1} n_{3,l,a}^f,$$

$$\text{or } \frac{1}{M}\sum_{f=0}^{M-1} n_{3,l,b}^f.$$

Alt 10:

$$s_{f,t}^x = e^{\frac{j2\pi f_x\left(\frac{N}{N_3}n_{3,l}^{(f^{**})} + t(N+CP)\right)}{N}},$$

x=0,1 . . . , X−1

Alt 11:

$$s_t^x = e^{j2\pi f_x \frac{n_{3,l}^{(x)}}{N} + j2\pi F_x t T_{OFDM}},$$

x=0,1, . . . X−1. and M=X;

Alt 12:

$$s_t^x = e^{\frac{j2\pi f_x\left(n_{3,l}^{(x)} + t(N+CP)\right)}{N}},$$

x=0,1 . . . , X−1 and M=X;

$$f_x = \frac{F_x}{\Delta f}.$$

When the second type of vector set isn't reported for each layer, the subscript l of $n_{3,l}{}^f$, $n_{3,l}{}^{f^*}$, $n_{3,l}{}^{f^{**}}$, $n_{3,l,a}{}^f$, $n_{3,l,b}{}^f$ can be deleted. Note that $f_x$ is a value associated with a third type of vector with index x, which may be smaller than 3 or 2, for example, $$-\frac{4}{3}2^{-\mu} \le f_x \le \frac{4}{3}2^{-\mu},$$

but f is an index of second type of vector among M second type of vectors f ∈ {0,1, . . . M−1} The sub carrier space of the CSI-RS is Δf=2$^\mu$*15 kHz.

$T_{OFDM}$ is time duration of one OFDM symbol. For example $T_{OFDM} = T_{OFDM}{}^\mu = (N_u{}^\mu + N_{cp}{}^\mu)T_c$, $$T_c = \frac{1}{480*4096} \text{ ms,}$$

$$N_u{}^\mu = 2048 \ \kappa*2^{-\mu}$$

$$N^\mu_{CP,l_{OFDM}} =$$

$$\begin{cases} 512\kappa*2^{-\mu}, \text{ extended cyclic prefix} \\ 144\kappa*2^{-\mu}+16\kappa, \text{ normal cyclic prefix, } l_{OFDM}=0, \text{ or } l_{OFDM}=7*2^\mu \\ 144\kappa*2^{-\mu}, \text{ normal cyclic prefix, } l_{OFDM} \neq 0, \text{ and } l_{OFDM}=7*2^\mu \end{cases}$$

wherein $l_{OFDM}$ is OFDM symbol index in a subframe. $\kappa=64$. For different $l_{OFDM}$, the $T_{OFDM}$ may be different, then $T_{OFDM}$ can be marked by $T_{OFDM, \ l_{OFDM}}$. $N_3$ is number of frequency domain unit in one OFDM symbol or in one first type of time domain unit. $N=N_u{}^\mu$, $CP=N_{cp,l_{OFDM}}{}^\mu$, In another implementation, $N=N_u{}^\mu|(\kappa 2^{-\mu})$, $CP=N_{cp,l_{OFDM}}{}^\mu|(\kappa 2^{-\mu})$. For example $$\frac{N+CP}{N} = \frac{2048+144}{2048} = \frac{2192}{2048}$$

for $l_{OFDM} \neq 0$ and $l_{OFDM} \neq 7*2^\mu$ and normal CP(cyclic prefix)

$$\frac{N+CP}{N} = \frac{(2048+144)+16*2^\mu}{2048} = \frac{2192+16*2^\mu}{2048}$$

for $l_{OFDM}=0$ and $l_{OFDM}=7*2^\mu$ and normal CP(cyclic prefix)

$$\frac{N+CP}{N} = \frac{2048+512}{2048} = \frac{2560}{2048}$$

for extended CP.

We see that the CP length is different for different OFDM symbol set if normal CP is used. The first OFDM symbol set includes OFDM symbol with index $l_{OFDM} \in \{0,7*2^\mu\}$. The second OFDM symbol set includes OFDM symbol with index $l_{OFDM} \notin \{0,7*2^\mu\}$ and $l_{OFDM}=0,1, \ldots, 14*2^\mu$.

$$\frac{t(N+CP)}{N} = \frac{t*2192+z*16*2^\mu}{2048},$$

wherein Z is the number of OFDM symbols with longer CP from start of a first type of time domain unit with t=0 to the end of the time unit with current t.

If one first type of time domain unit includes one OFDM symbol, the t is an index of the OFDM symbol relative to start of $T_3$ which is not start of a slot then $$\frac{t(N+CP)}{N} = \frac{t(2192)+(\lfloor t/(7*2^\mu) \rfloor + r)*16*2^\mu}{N}$$

$$r = \begin{cases} 1, & \text{if the starting position with long } CP \\ 0, & \text{otherwise} \end{cases}$$

or

If the t is an index of the OFDM symbol relative to start OFDM symbol of $T_3$ which is start of a slot then $$\frac{t(N+CP)}{N} = \frac{t*2192+\lfloor t/(7*2^\mu) \rfloor *16*2^\mu}{N}$$

If one of Alt 1,2,3,6,11, or 7 is adopted, then $F_x$ whose unit is Hz needs to be reported. We need to determine the quantify step for reporting $F_x$ should be determined. In some implementation, the quantification step may be 100 Hz, or 50 Hz, or other value.

If one of Alt 4,5,8,9,11, or 10 is adopted, then $$f_x = \frac{F_x}{\Delta f}.$$

The unit of $f_x$ is 1, or we can say that the unit of $f_x$ is $\Delta f$. $f_x$ needs to be reported. In some implementation, the quantify step for reporting $f_x$ should be determined. For example, $f_x \in \{0,0.1,0.2, \ldots ,2\}$. In some implementation, the quantify step depends on sub carrier spacing $\Delta f$. For example, larger the reference sub carrier spacing $\Delta f$ is, the smaller the quantify step is. For example, if the reference sub carrier spacing $\Delta f$ is 15 kHz, then the quantify step is 0.1, that is $f_x \in \{0,0.05,0.1, \ldots ,2\}$. If the reference sub carrier spacing $\Delta f$ is 30 kHz, then the quantify step is 0.05, that is $f_x \in \{0,0.05,0.1, \ldots ,2\}$. The reference sub carrier spacing $\Delta f$ can be subcarrier space of the p CSI-RS ports, or a sub carrier space configured in one CSI reporting.

In above description (we call it as a first method of for determining t of a third type of vector, or each of third type of vector), t=0,1 ..., $C_3-1$, that is for a frequency domain unit k, the UE feedback $C_3$ precoding matrices each of which corresponds to one domain unit of $T_3$. The UE feedback a respective precoding matrix for each time unit with index t of $T_3$, that is $C_4=C_3$ The t is relative to start of the $T_3$.

In a second method of for determining t of a third type of vector, the UE just feedback a precoding matrix for a set of a first type of time domain unit during $T_1$, each first type of time domain unit in the set includes one transmission occasion of the P CSI-RS ports, that is $t=t_{CSI-RS,occasion-1}$, $t_{CSI-RS,occasion-2}, \ldots, t_{CSI-RS,occasion-1}$ in formula (1-4), or other formula of third type of vector, $t_{CSI-RS,occasion-i}$ is the index of one first type domain time unit including the $i^{th}$ CSI-RS transmission occasion during $T_1$. The first type of time domain unit index is relative to first OFDM symbol of a time unit with index t=0, wherein a time unit with index t=0 is before the CSI-RS transmission occasion with index i=0. For example, the CSI-RS 1 transmission occasion 1 is in OFDM 8 in slot 3 and one first type of time unit includes one OFDM symbol, and the t is relative to starting of slot 3, then $t_{CSI-RS,occasion-1}$ equals 9. $C_4=C_1$ In a third method for determining t of a third type of vector, it is same with the second implementation except that $$t=0, t_{CSI-RS, \ position-2} - t_{CSI-RS, \ position-1}, \ldots,$$
$$t_{CSI-RS, \ position-C_1} - t_{CSI-RS, \ position-1} = 0,$$
$$t_{CSI-RS, \ position-2}, \ldots, t_{CSI-RS,position-C_1}$$

That is the t is relative to a first type of time domain unit including the first transmission occasion of P CSI-RS ports. The first type of time domain unit with index 0 includes the first transmission occasion of P CSI-RS ports. $C_4=C_1$ In a fourth method for determining t of a third type of vector, it is same with the first implementation except that $$t=t_{no-CSI-RS, \ position}, t_{no-CSI-RS, \ position}+1, \ldots,$$
$$t_{CSI-RS.position-1}, t_{CSI-RS, \ position-1}+1, \ldots,$$
$$t_{CSI,position-2}, t_{CSI,position-2}+1 \ldots,$$
$$t_{CSI,position-C_1}, t_{CSI,position-C_1}+1, \ldots$$

wherein $t_{CSI-RS,\,position\_i}$ is the $i^{th}$ transmission occasion of the P CSI-RS ports during $T_3$. t is relative to a OFDM symbol which is before the first OFDM symbol of a time unit including the first transmission occasion of the P CSI-RS ports in a burst. That is the first time unit of $T_3$ is before the first OFDM symbol of a first type of time unit including the first transmission occasion of the P CSI-RS ports in a burst.

In some implementation, if all $C_4$ first type of time units have same length in time such as in unit of second, then the t is a first type of time domain unit index. If at least two first type of time domain units have different length in time, the t is OFDM symbols index.

In some implementation, if all $C_4$ first type of time units have same number of OFDM symbols, then the t is a first type of time domain unit index. If at least two first type of time domain units have different numbers of OFDM symbols, the t is OFDM symbols index.

For determining t of a third type of vector(or for each third type of vector in the second vector set), if the first or the fourth method is adopted, the PMI indicates $N_3$ matrices for each first type of time domain unit during $T_3$ regardless whether the a first type of time domain unit includes a transmission occasion of the PCSI-RS ports, that is some first type of time domain units of the $C_4$ first type of time domain units include one transmission occasion of the PCSI-RS ports and some first type of time domain units of the $C_4$ first type of time domain units don't include any one transmission occasion of the PCSI-RS ports. The first type of time domain unit index is continuous. If the second or the third method is adopted, the PMI indicates $N_3$ matrices for each first type of time domain unit which includes one transmission occasion of PCSI-RS ports. The first type of time domain unit index can be non-continuous, or continuous. In some implementation, if X is larger than 1, the X $F_x$,x=0,1, . . . , X–1 or X $f_x$,x=0,1, . . . , X–1 is reported by differential method with a reference value. If the UE reports $F_x$, the reference value can be $F_{reference}$ or $F_0$. The reference value is reported using absolute value or the F reference value is a value determined by a rule or a fixed value which isn't reported by the UE. If the reference value is $F_{reference}$, the UE reports $F_{reference}$ and $F'_x=F_x-F_{reference}$, x=0,1,2, . . . X–1. If the reference value is $F_0$, the UE reports $F_0$ and $F'_x=F_x-F_0$, x=1,2, . . . X–1. The period of reporting the reference value such as $F_{reference}$ (or $F_0$) can be equal to period of reporting $F'_x$ or be multiple of period of reporting $F'_x$. If the UE reports $f_x$, the reference value can be $f_{reference}$ or $f_0$. The reference value is reported using absolute value or the reference value is a value determined by a rule or a fixed value which isn't reported by the UE. If the reference value is $f_{reference}$, the UE reports $f_{reference}$ and $f'_x=f_x-f_{reference}$, x=0,1,2, . . . X–1. If the reference value is $f_0$, the UE reports $f_0$ and $f'_x=f_x-f_0$, x=1,2, . . . X–1.The period of reporting the reference value such as $f_{reference}$ (or $f_0$) can be equal to period of reporting $f'_x$ or be multiple of period of reporting $f'_x$. In some implementation, the $F'_x$, or $f'_x$ can be directly used to generate the third type of vector. For example, the $F_x$ in above Alt 1-3,6,7,11 of format of the third type of vector with index x can be replaced with $F'_x$. The $f_x$ in above Alt 4,5,8-10,12 of format of the third type of vector with index x can be replaced with $f'_x$. If the reference value is $F_0$ or $f_0$, the UE just reports X–1 $F'_x$ or $f'_x$ for x=1,2, . . . , X–1. $F'_0=0$. $f'_0=0$. The UE doesn't report $F'_0$ and $f'_0$ to gNB.

In another implementation, the X $F_x$,x=0,1, . . . , X–1 or X $f_x$,x=0,1, . . . , X–1 is reported by divided by the reference value. The UE reports $F_0$ and $F'_x=F_x/F_0$, x=1,2, . . . X–1 if the reference value is $F_0$. The UE reports $F_{reference}$ and $F'_x=F_x/F_{reference}$, x=0,1,2, . . . X–1 if the reference value is $F_{reference}$ which isn't one of X $F_x$. The UE reports $f_0$ and $f'_x=f_x/f_0$, x=1,2, . . . X–1 if the reference value is $f_0$. The UE reports of $f_{reference}$ and $f'_x=f_x/f_{reference}$, x=0,1,2, . . . X–1 if the reference value is $f_{reference}$ which isn't one of X $F_x$. The quantify step of $f_0$, $f_{reference}$, or $f'_x$ depends on sub carrier spacing $\Delta f$. For example, larger the reference sub carrier spacing $\Delta f$ is, the smaller the quantify step is. For example, if the reference sub carrier spacing $\Delta f$ is 15 kHz, then the quantify step $f'_x$ of the reference value is 0.1, that is $f_{reference}$, or, $f_0\in\{0,0.1,0.2, . . . , 2\}$ and the step of $f'_x$ is 0.01 that is $f'_x\in\{0,0.01,0.0,2 . . . , 1\}$. If the reference sub carrier spacing $\Delta f$ is 30 kHz, then the quantify step of is 0.05, that is $f_{reference}$, $f_0\in\{0,0.05,0.1, . . . , 2\}$ and the step of $f'_x$ is 0.005 that is $f'_x\in\{0,0.005,0.01, . . . , 1\}$.

In some implementation, the reference value such as $f_{reference}$, $f_0$, $F_{reference}$, $F_0$ of multiple serving cell can be same/have relationship. The $f_{reference}$, $f_0$, $F_{reference}$, $F_0$ used to determine first precoding matrices corresponding to CSI-RS ports received in serving cell 1 and the $f_{reference}$, $f_0$, $F_{reference}$, $F_0$ used to determine precoding matrices corresponding to CSI-RS ports received in serving cell 2 are same or have relationship. For example, $f_{reference,servingcell1}=f\,f_{reference,servingcell2}$, $f_{0,servingcell1}=bf_{reference,servingcell2}$, $F_{reference,servingcell1}=bF_{reference,servingcell2}$, $F_{0,servingcell1}=bF_{0,servingcell2}$ wherein b=1, or b is based on at least one of: received signaling, a reported value, frequency carrier of serving cell 1, frequency carrier of serving cell 2,or ratio between the two frequency carriers of the two serving cells. For example, b equals a quotient result of frequency carrier of serving cell 1 divided by frequency carrier of serving cell 2.

The granularity of the third type of vector set can be at least one of

In some implementation, the third type of vector set is specific to a layer. The CSI reported by the UE includes information about v third type of vector sets each of which corresponds to one layer of v layers. The precoding matrix $w_t^l$ for each layer l=0,1, . . . ,v–1 is based on $s_{l,t}^x$, that is D equals v, each of the v third type of vector set is used to determine a column of each of the $N_3*C_4$ precoding matrices and the column corresponds to the layer. The one set of PMI includes information about v third type of vector sets. For example, the one set PMI includes v set of $F_x$, $F'_x$, $f_x$, or $f'_x$. The $F_x$, $F'_x$, $f_x$, or $f'_x$ in Alt 1-12 can be replaced by $F_{l,x}$, $F'_{l,x}$, $f_{l,x}$, or $f'_{l,x}$ respectively.

In some implementation, the third type of vector set is specific to all layers.

In some implementation, the third type of vector set is specific to each first type of vector with index i=0,1, . . . ,L–1, the subscript of s has i, such as $s_{i,t}^x$. D equals L. The one set of PMI includes information about L third type of vector sets. For example, the one set PMI includes L sets of $F_x$, $F'_x$, $f_x$, or $f'_x$. The $F_x$, $F'_x$, $f_x$, or $f'_x$ in Alt 1-12 can be replaced by $F_{i,x}$, $F'_{i,x}$, $f_{i,x}$, or $f'_{i,x}$ respectively. Each of the L sets of third type of vectors is used to determine all columns of each of the $N_3*C_4$ precoding matrices.

In some implementation, the third type of vector set is specific to the first type of vector set;

In some implementation, the third type of vector set is specific to each second type of vector with index f=0,1, . . . ,M–1, the subscript of s has f, such as $S_{f,t}^x$. The one set of PMI includes information about M third type of vector sets. For example, the one set PMI includes M sets of $F_x$, $F'_x$, $f_x$, or $f'_x$. The $F_x$, $F'_x$, $f_x$, $f'_x$ in Alt 1-12 can be replaced by $F_{f,x}$, $F'_{f,x}$, $f_{f,x}$, or $f'_{f,x}$ respectively. Each of the M sets of third type of vectors is used to determine all columns of each of the $N_3*C_4$ precoding matrices. The any Alt 1-12 can be used to determine the format of the third type of vector instead of only Alt 1,4,6,8 can be used.

In some implementation, the third type of vector set is specific to each second type of vector with index $f=0,1,\ldots,M-1$, the subscript of third type of vector s has f, such as $s_{f,t}{}^x$. Different from above method that the UE reports M sets of $F_x$, $F'_x$, $f_x$, or $f'_x$, the UE reports only one set of M sets of $F_x$, $F'_x$, $f_x$, or $f'_x$, For different second parameter, the reported one set of $F_x$, $F'_x$, $f_x$, or $f'_x$ can determine one set of third type of vectors such as $s_{f,t}{}^x$ in Alt 1, Alt4, Alt 6, or Alt 8. Then the UE can determine M set of third type of vectors. Each of the M sets of third type of vectors is used to determine all columns of each of the $N_3*C_4$ precoding matrices and includes X third type of vectors.

In some implementation, the X=M. There is one to one mapping between the M second type of vectors and X third type of vectors. For example, Alt 11-12.

In some implementation, the third type of vector set is specific to the second type of vector set, there is no subscript f in the third type of vector.

In a word, the subscript of one third type of vector can includes at least one of layer index l, first type of vector index i, or the second type of vector index f. For example, $s_t{}^x$ can be marked by one of $s_{l,f,i,t}{}^x$, $s_{l,f,t}{}^x$, $s_{f,i,t}{}^x$, $x_{l,t}{}^x$, $s_{f,t}{}^x$, $s_{i,t}{}^x$, or $s_t{}^x$. $s_{l,f,i,t}{}^x$ is specific to one first type of vector with index i, one second type of vector with index f, and one layer index l. The UE needs to report L*M*v sets of third type of vectors, for example reports L*v*M sets of $F_x$, $F'_x$, $f_x$, or $f'_x$, Or the UE. reports L*v sets of third type of vectors such as reports L*v sets of $F_x$, $F'_x$, $f_x$, or $f'_x$. For M second type of vector f, the reported L*v sets of $F_x$, $F'_x$, $f_x$, or $f'_x$ can be extended to L*v*M. Each set corresponds to one i, one f and one l. There are X third type of vectors in each set. The X for different sets can be different or same. That is the number of third type of vectors in different of the D third type of vector sets can be different or same. $s_t{}^x$ in formula (1) and Alt 1-10 can be replaced with one of $s_{l,f,i,t}{}^x$, $s_{l,f,t}{}^x$, $s_{f,i,t}{}^x$, $s_{l,t}{}^x$, $s_{f,t}{}^x$, or $s_{i,t}{}^x$, Any one of $s_{l,f,i,t}{}^x$, $s_{l,f,t}{}^x$, $s_{f,i,t}{}^x$, $s_{l,i,t}{}^x$, $s_{l,t}{}^x$, $s_{f,t}{}^x$, or $s_{i,t}{}^x$ is got based on any of above Alt 1-12 of getting a third type of vector with index x.

$s_{l,f,t}{}^x$ is specific to the first type of vector set and shared by all first type of vectors in the first type of vector set. $s_{f,i,t}{}^x$ is specific to all layers and shared by all layers. $s_{l,i,t}{}^x$ is specific to all the second type of vector sets and shared by all second type of vectors. $s_{l,t}{}^x$ is specific to the first and second type of vector set and shared by all first and second type of vectors in the first and second type of vector set. $s_{f,t}{}^x$ is only specific to each second type of vector. $s_{i,t}{}^x$ is only specific to each first type of vector. $s_t{}^x$ is shared by all layers, all first type of vector and all second type of vectors.

The time domain index t is increased in duration $T_3$.

In a word, the UE reports one set of PMI in one CSI reporting. The PMI indicates $C_4*N_3$ precoding matrices. Each of $C_4*N_3$ precoding matrices corresponds to one frequency domain unit and one first type of time domain unit. The information included in the one set PMI applies each of the $C_4*N_3$ precoding matrices. wherein the $C_4$ is larger than 1, and/or $C_4*N_3$ is larger than 1.

The one set of PMI includes information about the three type of vector sets and weighted coefficient $a_{l,i,f,x,t}$.

$C_4$ is the number of elements included in one third type of vector. For example, in the first method of determining t of a third type of vector, $t=0,1,\ldots,C_3$, then $C_4=C_3$. In the second method of determining t of a third type of vector, $t=t_{CSI-RS,occasion-1}$, $t_{CSI-RS,occasion-2},\ldots,t_{CSI-RS,occasion-C_1}$, then $C_4=C_1$. In the third method of determining t of a third type of vector, $t=0$, $t_{CSI-RS,position-2},\ldots,t_{CSI-RS,position-C_1}$, then $C_4=C_1$. In the fourth method of determining t of a third type of vector, $t=t_{no-CSI-RS,position}$, $t_{no-CSI-RS,position}+1,\ldots,t_{CSI-RS,position-1}$, $t_{CSI-RS,position-1}+1,\ldots,t_{CSI,position-2},t_{CSI,position-2}+1\ldots$, $t_{CSI,position-C_1}$, $t_{CSI,position-C_1}+1,\ldots$ $C_4$ is equal to or larger than $C_3$.

The L*M*X*v weighted coefficients $a_{l,i,f,x,t}$ can reported by using at least one of following methods.

Method 1. $a_{l,i,f,x,t}=p_{l,\lfloor i/L\rfloor}{}^{(1)}p_{l,i,f,x}{}^{(2)}\varphi_{l,i,f,x}$, the UE reports $p_{l,\lfloor i/L\rfloor}{}^{(1)}$, $p_{l,i,f,x}{}^{(2)}\varphi_{l,i,f,x}$.

Then formula (1) can be replaced as formula $$W_t^l = \begin{bmatrix} \sum_{i=0}^{L-1}v_ip_{l,0}^{(1)}\sum_{f=0}^{M-1}y_{k,l}^{(f)}\sum_{x=0}^{X-1}s_t^x p_{l,i,f,x}^{(2)}\varphi_{l,i,f,x} \\ \sum_{i=0}^{L-1}v_ip_{l,1}^{(1)}\sum_{f=0}^{M-1}y_{k,l}^{(f)}\sum_{x=0}^{X-1}s_t^x p_{l,i+L,f,x}^{(2)}\varphi_{l,i+L,f,x} \end{bmatrix} \tag{5}$$

If the $s_t{}^x$ in formula (5) is replaced with $s_{l,t}{}^x$, $s_{l,f,t}{}^x$, or $s_{l,i,f,t}{}^x$ respectively, the formula (3-4) also can be updated by formula (5). Of course, the $s_t{}^x$ in formula (5) can be replaced with one of $s_{l,f,i,t}{}^x$, $s_{l,f,t}{}^x$, $s_{f,i,t}{}^x$, $s_{l,i,t}{}^x$, $s_{l,t}{}^x$, $s_{f,t}{}^x$, or $s_{i,t}{}^x$.

Method 2: $a_{l,i,f,x,t}=p_{l,\lfloor i/L\rfloor}{}^{(1)}p_{l,x,\lfloor i/L\rfloor}{}^{(3)}$, $p_{l,i,f,x}{}^{(2)}\varphi_{l,i,f,x}$, then formula (1) can be replaced as formula $$W_t^l = \begin{bmatrix} \sum_{i=0}^{L-1}v_ip_{l,0}^{(1)}\sum_{f=0}^{M-1}y_{k,l}^{(f)}\sum_{x=0}^{X-1}s_t^x p_{l,x,0}^{(3)}p_{l,i,f,x}^{(2)}\varphi_{l,i,f,x} \\ \sum_{i=0}^{L-1}v_ip_{l,1}^{(1)}\sum_{f=0}^{M-1}y_{k,l}^{(f)}\sum_{x=0}^{X-1}s_t^x p_{l,x,1}^{(3)}p_{l,i+L,f,x}^{(2)}\varphi_{l,i+L,f,x} \end{bmatrix} \tag{6}$$

If the $s_t{}^x$ in formula (6) is replaced with $s_{l,t}{}^x$, $s_{l,f,t}{}^x$ or $s_{l,i,f,t}{}^x$ respectively, the formula (3-4) also can be updated by formula (6). Of course, the $s_t{}^x$ in formula (6) can be replaced with one of $s_{l,f,i,t}{}^x$, $s_{l,f,t}{}^x$, $s_{f,i,t}{}^x$, $s_{l,i,t}{}^x$, $s_{l,t}{}^x$, $s_{f,t}{}^x$, or $s_{i,t}{}^x$. The UE can reports x and $$x^{} = \max_x p_{l,x,q=\lfloor i^*/L\rfloor}^{(3)}$$

for each layer l. Alternative, x*=x, $p_{l,x^{},\lfloor i-/L\rfloor}^{(3)}$ doesn't needs to be reported by the UE because $p_{l,x^{**},\lfloor i^*/L\rfloor}^{(3)}=1$.

Method 3: $a_{l,i,f,x,t}=p_{l,\lfloor i/L\rfloor}{}^{(1)}p_{l,x,\lfloor i/L\rfloor}{}^{(3)}\varphi_{l,x,\lfloor i/L\rfloor}{}^{(3)}p_{l,i,f,x}{}^{(2)}\varphi_{l,i,f,x}$ then formula (1) can be replaced as formula $$W_t^l = \begin{bmatrix} \sum_{i=0}^{L-1}v_ip_{l,0}^{(1)}\sum_{f=0}^{M-1}y_{k,l}^{(f)}\sum_{x=0}^{X-1}s_t^x p_{l,x,0}^{(3)}\varphi_{l,x,0}^{(3)}p_{l,i,f,x}^{(2)}\varphi_{l,i,f,x} \\ \sum_{i=0}^{L-1}v_ip_{l,1}^{(1)}\sum_{f=0}^{M-1}y_{k,l}^{(f)}\sum_{x=0}^{X-1}s_t^x p_{l,x,1}^{(3)}\varphi_{l,x,1}^{(3)}p_{l,i+L,f,x}^{(2)}\varphi_{l,i+L,f,x} \end{bmatrix} \tag{7}$$

The UE can reports x and $$x^{} = \max_x p_{l,x,q=\lfloor i^*/L\rfloor}^{(3)}$$

for each layer l. Alternative, x*=x, $p_{l,x^{},\lfloor i^*/L\rfloor}^{(3)}$, $\varphi_{l,x^{**},\lfloor i^*/L\rfloor}^{(3)}$ doesn't needs to be reported by the UE because $p_{l,x^{**},\lfloor i^*/L\rfloor}^{(3)}=1$. $\varphi_{l,x^{**},\lfloor i^*/L\rfloor}^{(3)}=1$.

Method 4: $a_{l,i,f,x,t}=p_{l,\lfloor i/L\rfloor}^{(1)}p_{l,x}^{(3)}\varphi_{l,x}^{(3)}p_{l,i,f,x}^{(2)}\varphi_{l,i,f,x}$ then formula (1) can be replaced as formula $$W_t^l = \begin{bmatrix} \sum_{i=0}^{L-1}v_ip_{l,0}^{(1)}\sum_{f=0}^{M-1}y_{k,l}^{(f)}\sum_{x=0}^{X-1}s_t^xp_{l,x}^{(3)}\varphi_{l,x}^{(3)}p_{l,i,f,x}^{(2)}\varphi_{l,i,f,x} \\ \sum_{i=0}^{L-1}v_ip_{l,1}^{(1)}\sum_{f=0}^{M-1}y_{k,l}^{(f)}\sum_{x=0}^{X-1}s_t^xp_{l,x}^{(3)}\varphi_{l,x}^{(3)}p_{l,i+L,f,x}^{(2)}\varphi_{l,i+L,f,x} \end{bmatrix} \quad (8)$$

The UE can report x and $$x^{} = \max_x p_{l,x}^{(3)}$$

for each layer l. Alternative, x*=x, $p_{l,x^{}}^{(3)}$ and $\varphi_{l,x^{}}^{(3)}$ doesn't need to be reported by the UE because $p_{l,x^{}}^{(3)}=1$ and $\varphi_{l,x^{**}}^{(3)}=1$ Method 5: $a_{l,i,f,x,t}=p_{l,\lfloor i/L\rfloor}^{(1)}p_{l,x}^{(3)}p_{l,i,f,x}^{(2)}\varphi_{l,i,f,x}$, then formula (1) can be replaced as formula $$W_t^l = \begin{bmatrix} \sum_{i=0}^{L-1}v_ip_{l,0}^{(1)}\sum_{f=0}^{M-1}y_{k,l}^{(f)}\sum_{x=0}^{X-1}s_t^xp_{l,x}^{(3)}p_{l,i,f,x}^{(2)}\varphi_{l,i,f,x} \\ \sum_{i=0}^{L-1}v_ip_{l,1}^{(1)}\sum_{f=0}^{M-1}y_{k,l}^{(f)}\sum_{x=0}^{X-1}s_t^xp_{l,x}^{(3)}p_{l,i+L,f,x}^{(2)}\varphi_{l,i+L,f,x} \end{bmatrix} \quad (9)$$

The UE can report x and $$x^{} = \max_x p_{l,x}^{(3)}$$

for each layer l. Alternative, x*=x, $p_{l,x^{}}^{(3)}$ doesn't needs to be reported by the UE.

Method 6: $a_{l,i,f,x,t}=p_{l,\lfloor i/L\rfloor}^{(1)}p_{l,x}^{(3)}\varphi_{l,x}^{(3)}p_{l,f}^{(4)}p_{l,i,f,x}^{(2)}\varphi_{l,i,f,x}$, then formula (1) can be replaced as formula $$W_t^l = \begin{bmatrix} \sum_{i=0}^{L-1}v_ip_{l,0}^{(1)}\sum_{f=0}^{M-1}p_{l,f}^{(4)}y_{k,l}^{(f)}\sum_{x=0}^{X-1}s_t^xp_{l,x}^{(3)}\varphi_{l,x}^{(3)}p_{l,i,f,x}^{(2)}\varphi_{l,i,f,x} \\ \sum_{i=0}^{L-1}v_ip_{l,1}^{(1)}\sum_{f=0}^{M-1}p_{l,f}^{(4)}y_{k,l}^{(f)}\sum_{x=0}^{X-1}s_t^xp_{l,x}^{(3)}\varphi_{l,x}^{(3)}p_{l,i+L,f,x}^{(2)}\varphi_{l,i+L,f,x} \end{bmatrix} \quad (10)$$

The UE can reports x and $$x^{} = \max_x p_{l,x}^{(3)}$$

for each layer l and $p_{l,x^{**}}^{(3)}$ doesn't needs to be reported by the UE. Alternatively, x*=x, $p_{l,x^{}}^{(3)}$, $p_{l,0}^{(4)}$ doesn't needs to be reported by the UE because $p_{l,x^{**}}^{(3)}=1$, $p_{l,0}^{(4)}=1$.

Method 7: $a_{l,i,f,x,t}=p_{l,x\lfloor i/L\rfloor}^{(3)}$, $p_{l,i,f,x}^{(2)}\varphi_{l,i,f,x}$, then formula (1) can be replaced as formula $$W_t^l = \begin{bmatrix} \sum_{i=0}^{L-1}v_i\sum_{f=0}^{M-1}y_{k,l}^{(f)}\sum_{x=0}^{X-1}s_t^xp_{l,x,0}^{(3)}p_{l,i,f,x}^{(2)}\varphi_{l,i,f,x} \\ \sum_{i=0}^{L-1}v_i\sum_{f=0}^{M-1}y_{k,l}^{(f)}\sum_{x=0}^{X-1}s_t^xp_{l,x,1}^{(3)}p_{l,i+L,f,x}^{(2)}\varphi_{l,i+L,f,x} \end{bmatrix} \quad (11)$$

If the $s_t^x$ in formula (11) is replaced with $s_{l,t}^x$, $s_{l,f,t}^x$ or $s_{l,i,f,t}^x$ respectively, the formula (3-4) also can be updated by formula (11). Of course, the $s_t^x$ in formula (11) can be replaced with one of $s_{l,f,i,t}^x$, $s_{l,f,t}^x$, $s_{f,i,t}^x$, $s_{l,i,t}^x$, $s_{l,t}^x$, $s_{f,t}^x$, or $s_{i,t}^x$ The UE can reports x and $$x^{} = \max_x p_{l,x,q=\lfloor i^*/L\rfloor}^{(3)}$$

for each layer l. Alternative, x*=x, $p_{l,x^{}\lfloor i^*/L\rfloor}^{(3)}$ doesn't needs to be reported by the UE because $p_{l,x^{**}\lfloor i^*/L\rfloor}^{(3)}=1$ Method 8: $a_{l,i,f,x,t}=p_{l,x\lfloor i/L\rfloor}^{(3)}\varphi_{l,x\lfloor i/L\rfloor}^{(3)}p_{l,i,f,x}^{(2)}\varphi_{l,i,f,x}$ then formula (1) can be replaced as formula $$W_t^l = \begin{bmatrix} \sum_{i=0}^{L-1}v_i\sum_{f=0}^{M-1}y_{k,l}^{(f)}\sum_{x=0}^{X-1}s_t^xp_{l,x,0}^{(3)}\varphi_{l,x,0}^{(3)}p_{l,i,f,x}^{(2)}\varphi_{l,i,f,x} \\ \sum_{i=0}^{L-1}v_i\sum_{f=0}^{M-1}y_{k,l}^{(f)}\sum_{x=0}^{X-1}s_t^xp_{l,x,1}^{(3)}\varphi_{l,x,1}^{(3)}p_{l,i+L,f,x}^{(2)}\varphi_{l,i+L,f,x} \end{bmatrix} \quad (12)$$

The UE can reports x and $$x^{} = \max_x p_{l,x,q=\lfloor i^*/L\rfloor}^{(3)}$$

for each layer l. Alternative, x*=x, $p_{l,x^{}\lfloor i^*/L\rfloor}^{(3)}$, $\varphi_{l,x^{**}\lfloor i^*/L\rfloor}^{(3)}$ doesn't needs to be reported by the UE because $p_{l,x^{**}\lfloor i^*/L\rfloor}^{(3)}=1$. $\varphi_{l,x^{**}\lfloor i^*/L\rfloor}^{(3)}=1$ Method 9:

$$a_{l,i,f,x,t} = p_{l,x,\lfloor i/L\rfloor}^{(3)}e^{j2\pi f_x\frac{n_{3,l}^f}{N}}p_{l,i,f,x}^{(2)}\varphi_{l,i,f,x},$$

then formula (1) can be replaced as formula $$W_t^l = \begin{bmatrix} \sum_{i=0}^{L-1}v_i\sum_{f=0}^{M-1}y_{k,l}^{(f)}\sum_{x=0}^{X-1}s_t^xp_{l,x,0}^{(3)}e^{j2\pi f_x\frac{n_{3,l}^f}{N}}p_{l,i,f,x}^{(2)}\varphi_{l,i,f,x} \\ \sum_{i=0}^{L-1}v_i\sum_{f=0}^{M-1}y_{k,l}^{(f)}\sum_{x=0}^{X-1}s_t^xp_{l,x,1}^{(3)}e^{j2\pi f_x\frac{n_{3,l}^f}{N}}p_{l,i+L,f,x}^{(2)}\varphi_{l,i+L,f,x} \end{bmatrix} \quad (13)$$

Method 10:

$$a_{l,i,f,x,t} = p_{l,x}^{(3)}e^{j2\pi f_x\frac{n_{3,l}^f}{N}}p_{l,i,f,x}^{(2)}\varphi_{l,i,f,x},$$

then formula (1) can be replaced as formula $$W_t^l = \begin{bmatrix} \sum_{i=0}^{L-1} v_i \sum_{f=0}^{M-1} y_{k,l}^{(f)} \sum_{x=0}^{X-1} s_t^x p_{l,x,0}^{(3)} e^{j2\pi f_x \frac{n_{3,l}^f}{N}} p_{l,i,f,x}^{(2)} \varphi_{l,i,f,x} \\ \sum_{i=0}^{L-1} v_i \sum_{f=0}^{M-1} y_{k,l}^{(f)} \sum_{x=0}^{X-1} s_t^x p_{l,x}^{(3)} e^{j2\pi f_x \frac{n_{3,l}^f}{N}} p_{l,i+L,f,x}^{(2)} \varphi_{l,i+L,f,x} \end{bmatrix} \quad (14)$$

Method 11: $a_{l,i,f,x,t} = p_{l,x}^{(3)} \varphi_{l,f,x}^{(3)} p_{l,i,f,z}^{(2)} \varphi_{l,i,f,x}$, then formula (1) can be replaced as formula $$W_t^l = \begin{bmatrix} \sum_{i=0}^{L-1} v_i \sum_{f=0}^{M-1} y_{k,l}^{(f)} \sum_{x=0}^{X-1} s_t^x p_{l,x}^{(3)} \varphi_{l,f,x}^{(3)} p_{l,i,f,x}^{(2)} \varphi_{l,i,f,x} \\ \sum_{i=0}^{L-1} v_i \sum_{f=0}^{M-1} y_{k,l}^{(f)} \sum_{x=0}^{X-1} s_t^x p_{l,x}^{(3)} \varphi_{l,f,x}^{(3)} p_{l,i+L,f,x}^{(2)} \varphi_{l,i+L,f,x} \end{bmatrix} \quad (15)$$

Method 12: $a_{l,i,f,x,t} = p_{l\lfloor i/L \rfloor}^{(1)} p_{l,x}^{(3)} \varphi_{l,i,f,x}^{(2)} \varphi_{l,i,f,x}$, then formula (1) can be replaced as formula $$W_t^l = \begin{bmatrix} \sum_{i=0}^{L-1} v_i p_{l,0}^{(1)} \sum_{f=0}^{M-1} y_{k,l}^{(f)} \sum_{x=0}^{X-1} s_t^x p_{l,x}^{(3)} \varphi_{l,f,x}^{(3)} p_{l,i,f,x}^{(2)} \varphi_{l,i,f,x} \\ \sum_{i=0}^{L-1} v_i p_{l,0}^{(1)} \sum_{f=0}^{M-1} y_{k,l}^{(f)} \sum_{x=0}^{X-1} s_t^x p_{l,x}^{(3)} \varphi_{l,f,x}^{(3)} p_{l,i+L,f,x}^{(2)} \varphi_{l,i+L,f,x} \end{bmatrix} \quad (16)$$

In above method 1-12, If the $s_t^x$ in any of formula (5-16) is replaced with $s_{l,t}^x$, $s_{l,f,t}^x$ or $s_{l,i,f,t}^x$ respectively, the formula (3-4) also can be updated by any of formula (5-16). Of course, the $s_t^x$ in any formula (5-16) can be replaced with one of $s_{l,f,i,t}^x$, $s_{l,f,t}^x$, $s_{f,i,t}^x$, $s_{l,i,t}^x$, $s_{l,t}^x$, $s_{f,t}^x$, or $s_{i,t}^x$.

In above Method 1-12, the UE needs to report index of a strongest coefficient for each layer l such as $$p_{l,i^*,f^*,x^*}^{(2)} = \max_{i,f,x} p_{l,i,f,x}^{(2)} \text{ or } a_{l,i^*,f^*,x^*} = \max_{i,f,x} a_{l,i,f,x},$$

the UE reports $i^*$, $x^*$, $f^*$ corresponding to the strongest coefficient for each layer l. Alternative, the UE just reports information about $i^*$, the at least one of $x^*$ or $f^*$ doesn't need to be reported by the UE and define that $x^*=0$, and/or $f^*=0$.

In addition, $p_{l,i^*,f^*,x^*}^{(2)}=1$ $p_{l\lfloor i^*/L \rfloor}^{(1)}=1$ and $\varphi_{l,i^*,f^*,x^*}=1$, then $p_{l,i^*,f^*,x^*}^{(2)}$, $\varphi_{l,i^*,f^*,x^*}$, $p_{l\lfloor i^*/L \rfloor}^{(1)}$ don't needs to be feedback to gNB. Alternative, only $p_{l,i^*,f^*,x^*}^{(2)}=1$ $p_{l\lfloor i^*/L \rfloor}^{(1)}=1$, $p_{l,i^*,f^*,x^*}^{(2)}$, $p_{l\lfloor i^*/L \rfloor}^{(1)}$ don't needs to be feedback to gNB, but $\varphi_{l,i^*,f^*,x^*}$ needs to feedback to gNB. That is all remaining $\varphi_{l,i,f,x}$ doesn't needed to normalized with reference $\varphi_{l,i^*,f^*,x^*}$.

In addition, $p_{l,x^*}^{(3)}=1$, $\varphi_{l,x^*}^{(3)}=1$, and $p_{l,x}^{(3)}$, $\varphi_{l,x}^{(3)}$ doesn't needs to feedback to gNB.

In above Method 1-12, $p_{l\lfloor i/L \rfloor}^{(1)}$, $p_{l,i,f,x}^{(2)}$, $p_{l,x}^{(3)}$, $p_{l,x}^{(4)}$, $p_{l,x\lfloor i/L \rfloor}^{(3)}$ are amplitude coefficients and their phase is 0. $p_{l\lfloor i/L \rfloor}^{(1)}$, $p_{l,i,f,x}^{(2)}$, $p_{l,x}^{(3)}$, $p_{l,x}^{(4)}$, $p_{l,x\lfloor i/L \blacksquare}^{(3)}$ is equal to or larger than 0 and smaller than or equal to 1. $\varphi_{l,i,f,x}$, $\varphi_{l,x}^{(3)}$, $\varphi_{l,f,x}^{(3)}$ are phase coefficient and their amplitudes are 1. l=0,1 . . . , v−1,i=0,1, . . . ,2*L−1, f=0,1, . . . M−1, x=0,1, . . . X−1. For reporting the coefficient $a_{l,i,f,x}$, the UE reports at least one of $p_{l\lfloor i/L \rfloor}^{(1)}$, $p_{l,i,f,x}^{(2)}$, $p_{l,x}^{(3)}$, $p_{l,x}^{(4)}$, $p_{l,x\lfloor i/L \rfloor}^{(3)}$, $\varphi_{l,i,f,x}$, $\varphi_{l,x}^{(3)}$, or $\varphi_{l,f,x}^{(3)}$.

For each layer, to reports $p_{l,i,f,x}^{(2)}$ and $\varphi_{l,i,f,x}$, the UE reports a bitmap for each layer with L*M*X bits. If one bit of the bitmap indicates value 1, the $p_{l,i,f,x}^{(2)}$ and $\varphi_{l,i,f,x}$ corresponding the bit is in the CSI and reported to gNB, otherwise, the $p_{l,i,f,x}^{(2)}$ and $\varphi_{l,i,f,x}$ corresponding the bit isn't included in the CSI and define that its corresponding $p_{l,i,f,x}^{(2)}=0$.

The relationship between bitmap of M and X, The total number of 1 in the bitmap for each x=0,1,2 . . . , X−1 may be smaller than or equal to one threshold. The total number of 1 in the bitmap may be smaller than or equal to one threshold.

In some implementation, the UE can report Q sets of CQIs in one CSI reporting, wherein Q is larger than 1. Different sets of CQIs corresponds to different second type of time domain units. Different CQI in one set of CQI corresponds to different codewords or different frequency domain units.

In some implementation, Q is equal to or smaller than $C_4$.

Figure 3:
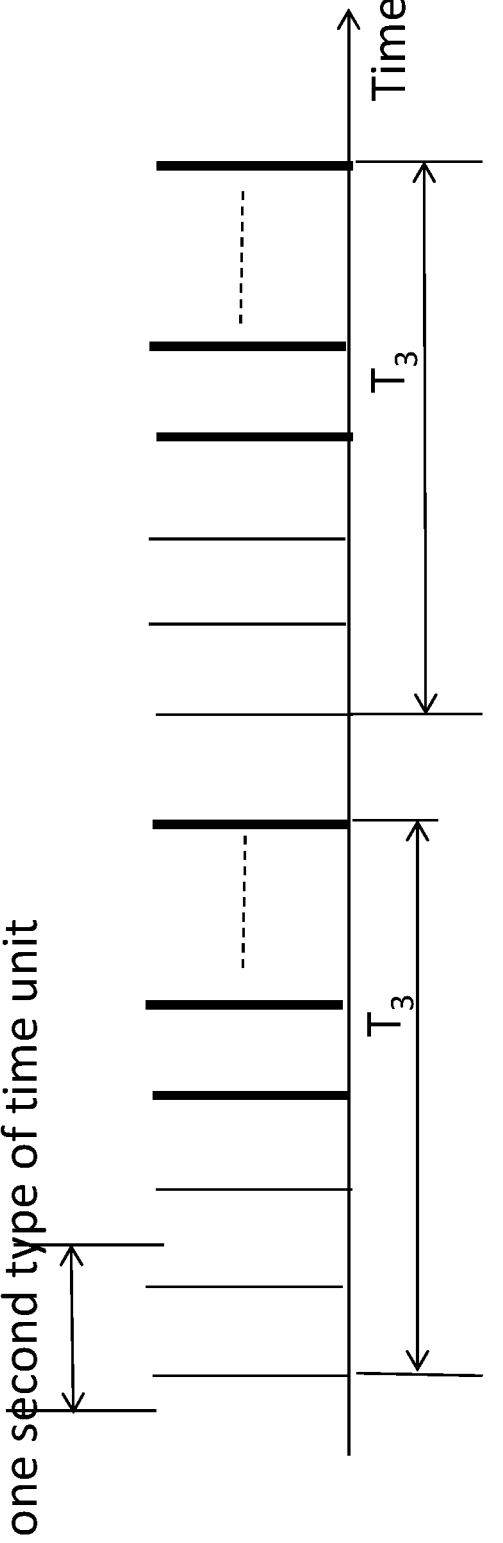
FIG. 3 is a timing diagram for example of a second type of time units.

In some implementation, one second type of time domain unit includes one or more the first type of time domain units. As shown in FIG. 3, one second type of time unit includes two first type of time domain units, then $$Q = \left\lceil \frac{C_4}{2} \right\rceil.$$

If $C_4$ is an odd value, then the last or the starting second type of time domain units may include only one first type of time domain unit. If the CQI is wideband, the CQI is based on the 2 set of precoding matrices in two first type of time domain units included in one second type of time domain unit corresponding to the CQI. If the CQI is subband, the CQI is based on the 2 precoding matrices in two first type of time domain units included in one second type of time domain unit corresponding to the CQI, wherein the 2 precoding matrices corresponds to one subband of the CQI.

For example, the UE gets $C_4$ precoding matrix sets for $C_4$ first type of time domain unit. Each of the $C_4$ precoding matrix sets corresponds to one of $C_4$ the first type of time domain units. The UE gets Q of CQI sets for Q second type of time domain unit.

In some implementation, the Q set of CQIs can be reported using differential methods. The Q set of CQIs corresponds to one reference CQI. Other CQI in the Q set of CQIs are reported using differential value with reference to the reference CQI. The UE also needs to report the index of second time domain unit corresponding to the reference CQI. In another implementation, the reference CQI corresponds to a second time domain unit with a predefined index, such as with index 0. The UE doesn't reports the index of second time domain unit corresponding to the reference CQI In another implementation, each of the Q set of CQI can be reported using differential methods. The Q set of CQIs corresponds to Q reference CQIs each of which corresponds to one of the Q set of CQIs.

In some implementation, different sets of the Q set of CQIs may include different number of CQI. For example, for a second type of time domain unit which includes at least one of transmission occasion of P CSI-RS ports corresponding to the CQI, the set of CQIs of the second type of time domain unit includes subband CQI. But for a second type of time domain unit which includes no transmission occasion of P CSI-RS ports corresponding to the CQI, the set of CQIs of the second type of time domain unit doesn't include subband CQI and only include wideband CQI.

In some implementation, the $$Q = \left\lceil \frac{C_1}{q} \right\rceil.$$

$C_1$ is the number of CSI-RS transmission occasions in a burst corresponding to the CSI reporting including at least one of PMI, CQI. The q is number of CSI-RS transmission occasions in one second type of time domain unit. q is an integer which is larger than 0. The UE only reports CQI for the second type of time domain unit including q CSI-RS transmission occasions except one or two second type of time domain units which includes at least one and less than q CSI-RS transmission occasions.

Similarly, the UE can reports R values of RI (rank indicator) in one CSI reporting, wherein R is larger than 1. Different values of the R values RIs corresponds to different third type of time domain units. The total layers (or total column) of each of $C_4*N_3$ precoding matrices is determined by one of the R values of RI. For example, the one RI is the first RI of a first type of time domain unit with index 0, or with first CSI-RS transmission occasion. In some implementations, the one RI can be maximal of the R values of RI. For a third type of time domain unit, the columns of each of $C_5*N_3$ precoding matrices indicated by the PMI may be different from the RI of the third type of time domain units, then the CQI of the third type of time domain unit is based on RI columns of each of precoding matrices of the third type of time domain unit indicated by the PMI and indicated RI of the third type of time domain unit. $C_5$ is the number of the $C_4$ first type of time domain units in the one third type of time units. For example, the PMI indicates $C_4*N_3$ precoding matrices for $C_4$ first type domain units. Each of the $C_4*N_3$ precoding matrices includes 4 columns each of which corresponds to one layers. The UE reports RI for 8 third type of time domain units as [4,3,4,2,1,4,4,3,1,1]. For a third type of time domain unit with RI value doesn't equal to 4, the UE gets the CQI for each second type of time domain unit of the third type of time domain unit, according to RI values of columns of each of the $C_5*N_3$ precoding matrices of the third type of time domain unit. For example, for the third type of time domain unit with index 1, the indicated RI is 3, the UE gets the CQI for each second type of time domain unit of the third type of time domain unit with index 1, according to 3 columns from 4 columns of each of the precoding matrices of the third type of time domain unit. The 3 columns of the 4 columns can be first 3 columns of the 4 columns, or indicated by information included in the CSI.

In some implementation, one third type of time domain unit includes one or more second type of time domain units. If one third type of time domain unit includes one second type of time domain unit, the third type of time domain unit equals to the second type of time domain unit, that is the second and third type of time domain units are same type of time unit.

In some implementation, the third type of time units equals time duration $T_3$, then R=1.

In some implementation, the $C_4$ first type of time unit, Q second type of time domain unit and R second type of time domain unit are all in duration $T_3$.

In some implementation, the second type of time units equals time duration $T_3$, then Q=1.

In a word, the UE can report at least one of PMI, Q sets of CQIs, or R value of RI in one CSI reporting.

Each of the Q sets of CQIs corresponds to one second type of time domain unit. The Q sets of CQIs are for Q second type of time domain units. The R value of RI corresponds to R third type of time domain units. Each of the R value of RI corresponds to one of R third type of time domain units. The PMI indicates $C_4$ sets of precoding matrices for $C_4$ first type of time domain units. Each of the $C_4$ sets includes $N_3$ precoding matrices. wherein Q, R, $C_4$ is integer which is larger than 0. And/or at least one of Q, R, $C_4$ is larger than 1.

In some implementation, $C_4 \geq Q \geq R$.

In some implementation, The CSI reporting should be configured with CMR (channel measurement reference such as the P CSI-RS ports)(or CMR+IMR (interference measurement reference)) and TRS or SSB. The UE gets the CSI based the CMR (or CMR+IMR) and at least one of TRS, or SSB (synchronization signal block). In the following we give the example of the TRS, it also applied to SSB.

To get the estimation of doppler shift or doppler spread such as $F_x$, $f_x$, $F'_x$ or, $f'_x$, it needs dense time domain TRS which is at least in coherent time. But more time occasions of CSI-RS is needed to get coefficient (such as $a_{l,i,f,x}$) and spatial domain vector set (such as $v_j$) and frequency domain vector selection (such as $y_{l,k}^f$), then the reported CSI may be more accurate. The measurement metric for TRS and CSI-RS are different.

For example, the measurement metric for TRS is $F_x$, $f_x$, $F'_x$ or, $f'_x$. it needn't denser time domain sample. It can be got as long as at least one path isn't blocked. The phase change between two TRS symbol shouldn't be larger than $\pi$ or $2\pi$. For example, $F_x \Delta t \leq \pi$, or $F_x \Delta t \leq 2\pi$, wherein $\Delta t$ is time gap between two TRS symbols.

The measurement metric of CSI-RS is for spatial domain vector (e.g., the first type of vector) and frequency domain vector (e.g., the second type of vector) selection and weighted coefficient $a_{l,i,f,x}$ determination as shown in formula 1-12. It needs more time occasion considering some path is blocked at some instance or considering interference burst.

Alt1: TRS and CSI-RS have same period and TRS is denser than CSI-RS in one slot. One CSI-RS reporting period includes one period of CSI-RS and one period TRS.

Alt2: The period of CSI-RS and TRS can be same. One CSI-RS period includes $C_1$ CSI-RS transmission occasions of the P CSI-RS ports and $C_R$ TRS transmission occasions. TRS is denser than CSI-RS in one slot and there are one than one CSI-RS transmission occasions in one CSI-RS period. The $C_1$ CSI-RS transmission occasions are in one burst of the P CSI-RS. The $C_R$ TRS transmission occasions are in one burst. The gap between continuous TRS transmission occasions of the $C_R$ transmission occasions are smaller than the gap between continuous CSI-RS transmission occasions of the $C_1$ transmission occasions. In some implementation, $C_1 \geq C_R$. In some implementation, the burst including $C_1$ CSI-RS transmission occasions of the P CSI-RS ports is longer than the burst including the $C_R$ TRS transmission occasions.

Alt 3: One CSI-RS period includes $C_1$ CSI-RS resources and $C_R$ TRS transmission resources. The $C_1$ CSI-RS resource has relationship such as same number of CSI-RS ports, one to one mapping between CSI-RS port, same period. But $C_1$ CSI-RS resources may need more description to clarify that the CSI is based on $C_1$ CSI-RS resource. The N TRS resources have relationship. One CSI-RS period corresponds to one CSI reporting. The M CSI-RS transmission occasion can be equally/unequally distributed.

Alt 4: CSI-RS and TRS are same signal.

Alt 5: One of CSI-RS port are TRS.

In above description, the CSI is determined according to P CSI-RS ports received on multiple transmission occasions in one period of P CSI-RS ports. The gNB should configure information about the multiple transmission occasions of the P CSI-RS ports.

In a first implementation, the multiple transmission occasions corresponding to one CSI-RS resource which includes the P CSI-RS ports.

The gNB should configure information about the multiple transmission occasions of the one CSI-RS resource by configuring at least one of a OFDM symbol index of the starting transmission occasion, the number of transmission occasions, OFDM symbol gap between two continuous transmission occasions, slot gap between two continuous transmission occasions, a set of slot offset, an OFDM symbol index for each transmission occasions, a set of OFDM symbol gap.

For example, the UE can configure the multiple transmission occasion using one or more following Method 1-6.

Method 1: the gNB configures OFDM symbols of starting transmission occasion, the number of transmission occasions and OFDM symbol gap between two continuous transmission occasions, then the UE can get the multiple transmission occasions. One transmission occasion can includes one or more OFDM symbol, wherein different OFDM symbols of one transmission occasion includes different CSI-RS ports of the one CSI-RS resource.

Method 2: The gNB configure a OFDM symbol index of starting transmission occasion and a set of slot offset for the one CSI-RS resource. The multiple transmission occasions of the one CSI-RS resource are in different slot and in OFDM symbol with same index. For example the first transmission occasion are in {OFDM symbol 1 and OFDM symbol 4} in slot n1 which is indicated by the first entry of the slot offset set, the second transmission occasion are in {OFDM symbol 1 and OFDM symbol 4} in slot n2 which is indicated by the first entry of the slot offset set.

Method 3: The gNB configure a OFDM symbol index of starting transmission occasion and the number of transmission occasions of the one CSI-RS resource. The multiple transmission occasions are in continuous slots and with same OFDM symbol index. Alternatively, the multiple transmission occasions are in continuous available slots and with same OFDM symbol index. Symbols of the one CSI-RS resource in one available slot are available symbols. For example, it isn't an uplink symbol, a symbol for PRACH (physical random access channel), an symbol of SSB.

Method 4: The gNB configures a OFDM symbol index of starting transmission occasion, slot gap, the number of transmission occasions of the one CSI-RS resource. The multiple transmission occasions are in different slots with same OFDM symbol index. The slot gap between two continuous transmission occasions is the indicated slot gap.

Method 5: The gNB configures OFDM symbol index for each transmission occasions, the gap between two transmission occasion can be different for different two continuous transmission occasions. For example, the gap between transmission occasion 1 and 2 is 3 OFDM symbols, but the gap between transmission occasion 2 and 3 is 2 OFDM symbols. The offset of two OFDM symbols can be different for different transmission occasions. For example, the first transmission occasion are in {OFDM 1 and OFDM 4} in one slot, the second transmission occasion can be {OFDM 5 and OFDM 6} in the same one slot.

Method 6: The gNB configures OFDM symbol index for starting transmission occasion and a set of OFDM symbol gap. Then the gap between two continuous transmission occasion can be different for different two continuous transmission occasions but the offset between two OFDM symbols of one OFDM symbol is same. The OFDM symbol gap between the first transmission occasion and the second transmission occasion is the first entry of the set of OFDM symbol gap. The OFDM symbol gap between the second transmission occasion and the third transmission occasion is the second entry of the set of OFDM symbol gap, and so on The gNB can configure the one CSI-RS resource to UE and the UE gets CSI based on the configured CSI-RS resource. The CSI does not include CRI. Alternatively, the gNB configures a set of CSI-RS resource with multiple CSI-RS resources each of which with multiple transmission occasions configured by one Method 1 to method 6. The UE selects one CSI-RS resource and gets CSI based on the selected CSI-RS resource, the CSI includes CRI indicating the selected CSI-RS resources.

In a second implementation, the gNB configures the multiple occasions of the P CSI-RS ports using multiple CSI-RS resource, each transmission occasion corresponds to a CSI-RS resource. Different transmission occasion corresponds to different transmission occasions. The multiple transmission occasion can be in one or more CSI-RS resource sets. If they are in more than one CSI-RS resource sets, each set corresponds to one period and slot offset And the CSI is based one setting of CSI-RS resource sets, wherein one CSI-RS resource setting includes one or more CSI-RS resource sets. The gNB can directly configure one CSI-RS setting to let UE get the CSI. Alternatively, the gNB can configures multiple CSI-RS setting, If they are all in one CSI-RS resource set, the one set can corresponding to one period and more than one slot offset. Each CSI-RS resource can be configured with on slot offset. The multiple CSI-RS resources satisfies some restriction. The restriction includes that some parameter needs to be same for these CSI-RS resources in the CSI-RS resource set. The parameter includes at least one of: the number of CSI-RS ports, RB location, bandwidth, or period, In addition, these CSI-RS resources in the CSI-RS resource set are quasi-co-located QCL-ed with respective to QCL type A and QCL-type D, where applicable. Different CSI-RS resources in the CSI-RS resource set are in different time domain symbols in one slot or in different slots.

If one transmission occasion of the P CSI-RS ports includes more than one OFDM symbols, wherein different OFDM symbols of one transmission occasion includes different CSI-RS ports of the P CSI-RS ports, the gap between two transmission occasions is gap between starting OFDM symbols of two continuous transmission. One transmission occasion can be in one slot or multiple slot. Alternatively, it limits that one transmission occasions can only be one slot. In some implementation, the starting symbols of later transmission occasions is after the end of the former transmission occasion. For example, the first transmission occasion includes {OFDM symbol 1 including CSI-RS port {0-7}, OFDM symbol 4 including CSI-RS ports {8-15}} of slot n, the second transmission should start from OFDM 9 of slot n, such as the gap is 5, then the second transmission occasion includes {OFDM 6, OFDM 9}. In another implementation, the starting symbols of later transmission occasions is after the starting of the former transmission occasion and the two transmission occasion shouldn't be in one same symbols, that is the gap doesn't equal to offset of two OFDM symbols of one transmission occasion, such as the gap is 2, the second transmission occasion includes { OFDM 3, OFDM 6}. In a third implementation, the starting symbols of later transmission occasions is after the starting of the former transmission occasion and the two transmission occasion can be in one same symbols, that is the gap can equal offset of two OFDM symbols of one transmission occasion, such as the gap is 3, then the second transmission occasion includes { OFDM 4, OFDM 7}.

One CRI corresponds to one CSI-RS resource, one CSI-RS resource set, or one CSI-RS resource setting.

The UE reports a capability about at least one of the number of CSI-RS transmission occasions in a burst of the P CSI-RS ports used to generate the PMI, such as $C_1$; the number of elements in one third type of vector such as the value of $C_4$; the number of elements in one second type of vector such as the value of $N_3$, the L,M or X. That is the UE will report its supported maximal value of $C_1$. Because the UE needs to gets an actually precoding matrix for each transmission occasion, and get the PMI for the $N_4$ first type of time domain units. It requests UE capability reporting. In some implementation, the UE reports its capability about supported value sets about at least one of $C_1$, $C_4$, $N_3$, L,M or X. For example, the UE reports its supported value set of $C_1$ is {4,8,16}, In some implementation, the UE reports its capability about supported maximal value about at least one of $C_1$, $C_4$, $N_3$, L,M or X.

In some implementation, the UE reports a capability $C_1$

Example 2

For power allocation between panels and panel selection, the UE needs to feedback RSRP (reference signal received power) or RSRP offset to gNB. There are following method to report this information:

In some implementation, the gNB configures a set of CSI-RS/SSB resource set, the UE reported it selected CRI and corresponding RSRP/SINR (signal to interference and noise ratio). The maximal number of the reported pair of (CRI, RSRP) need to be extended, for example larger than 4;

In some implementation, the UE reports multiple pairs of (CRI, RSRP), the multiple RSRP is reported by quotient method such as the reported value is relative value:

$$RSRP_{i,relative} = \frac{RSRP_i}{RSRP_{max}} \in [0, 1],$$

i=0,1 ... E−1; The $RSRP_{max}$ corresponds to the first reported CRI/SSBRI, $RSRP_{0,relative}$=1 isn't reported to gNB. In another implementation, the UE reports absolute value of $RSRP_{max}$ for the first CRI and relative value of other reported CRI/SSBRI $RSRP_{i,relative}$, i=1,2, . . . , E−1. E is the quantity of the reported CRI/SSBRI.

In some implementation, the UE reports RSRP or relative value of each CRI, doesn't report CRI, just RSRP/relative RSRP. For example, the UE will reports absolute value of RSRP/relative RSRP for each CSI-RS resource/SSB resource in a candidate set.

In some implementation, the UE reported E CRI/SSBRI and one combination RSRP/SINR. For example, the UE reports E CRI/SSBRI and one RSRP (or SINR), wherein the one RSRP/SINR correspond to the E reported CRI/SSBRI, combination RSRP.

Various preferred solutions adopted by embodiments are listed as below.

Figure 4:
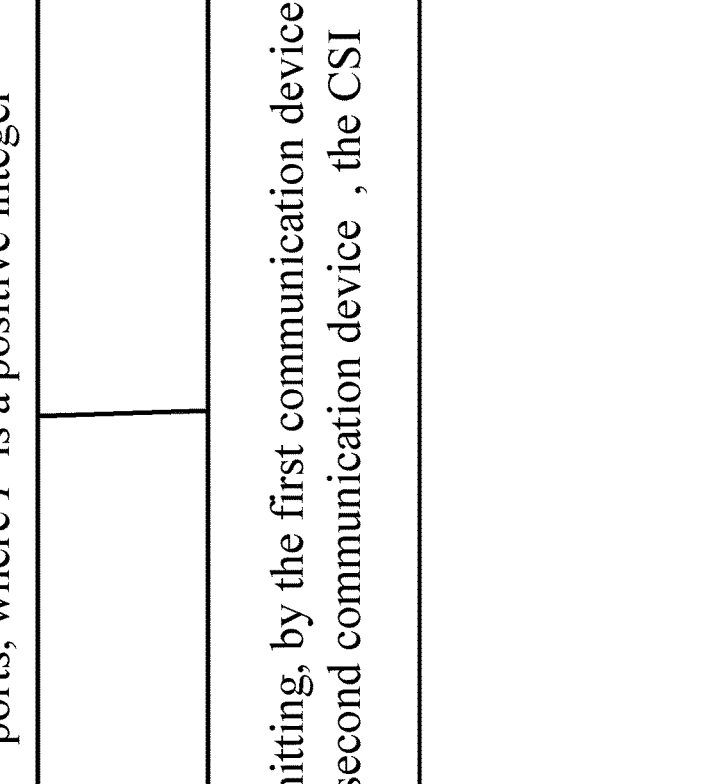
FIG. 4 is a flowchart for an example method of wireless communication.

One solution includes a method of wireless communication (e.g., method 400 depicted in FIG. 4), comprising: determining (402), by a first communication device, channel state information CSI corresponding to P ports, where P is a positive integer; and transmitting (404), by the first communication device to a second communication device, the CSI; wherein the CSI includes at least one set of a precoding matrix indicator PMI, Q sets of channel quality indicators CQIs, or R value of rank indicator RI, wherein the one set PMI indicates $C_4$ sets of precoding matrices corresponding to $C_4$ first type of time domain units, the Q dets of CQIs corresponds to Q second type of time domain units, the R values of RI corresponds to R third type of time domain units, and wherein Q, R, $C_4$ are positive integers.

The first communication device can be a first base station, or a first UE;

The second communication device can be a second base station, or a second UE

Figure 8:
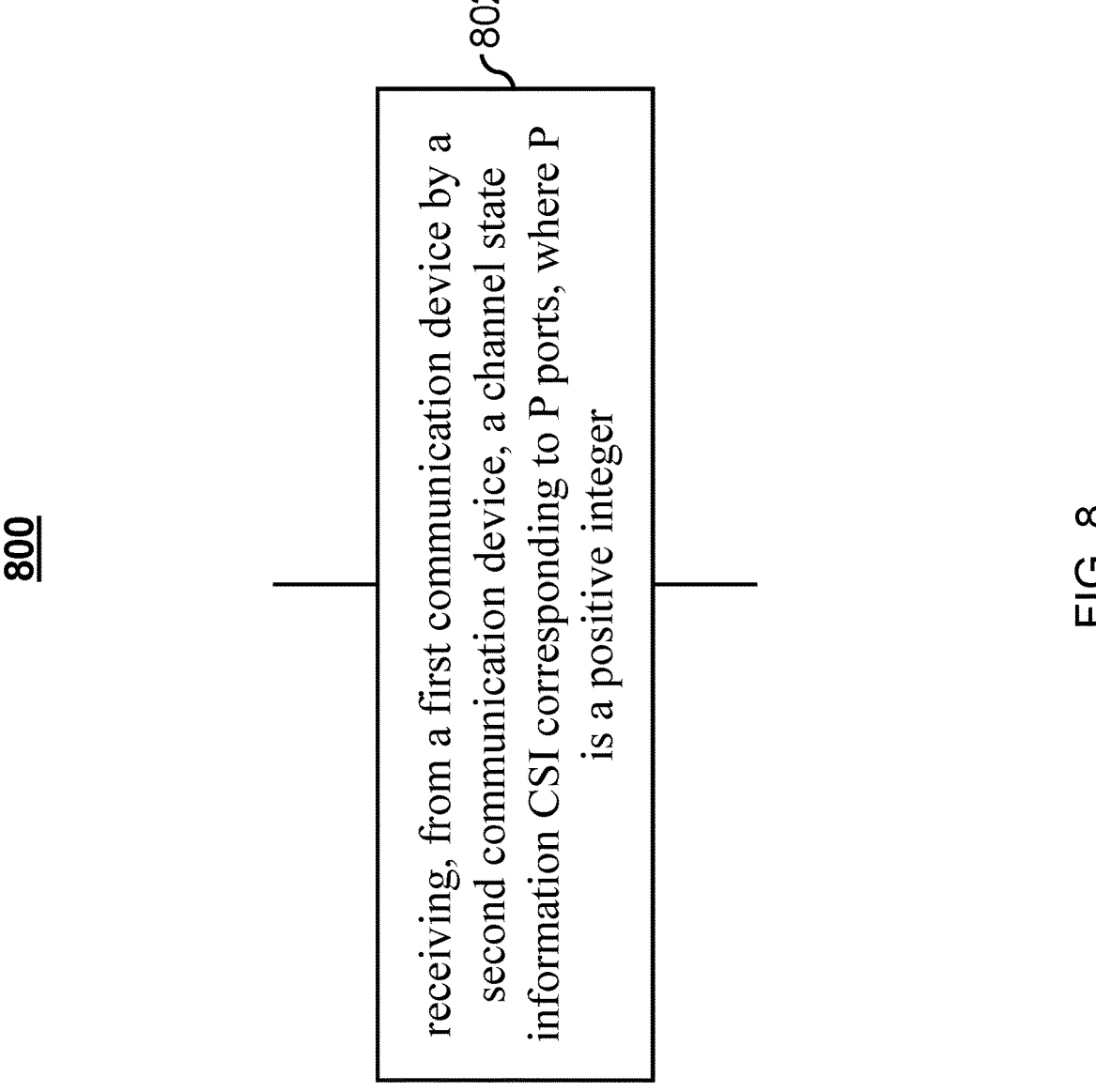
FIG. 8 is a flowchart for an example method of wireless communication.

Another solution includes a method of wireless communications (e.g., method 800 depicted in FIG. 8) includes: receiving (802), from a first communication device by a second communication device, a channel state information CSI corresponding to P ports, where P is a positive integer; wherein the CSI includes at least one set of a precoding matrix indicator PMI, Q sets of channel quality indicators CQIs, or R value of rank indicator RI, wherein the one set PMI indicates $C_4$ sets of precoding matrices corresponding to $C_4$ first type of time domain units, the Q sets of CQIs corresponds to Q second type of time domain units, the R values of RI corresponds to R third type of time domain units, and wherein Q, R, $C_4$ are positive integers.

Another solution includes a method of wireless communication (e.g., method 500 depicted in FIG. 5), comprising: receiving (502), by a first communication device from a second communication device, signal transmissions comprising transmissions of a first reference signal and a second reference signal according to a pattern; and transmitting (504), by the first communication device to the second communication device, channel state information according to the first reference signal and the second reference signal.

The wireless communication device feedback one set of PMI (precoding matrix indicator). The one set of PMI indicate $C_4$ set of precoding matrices corresponding to $C_4$ first type of time domain units. The one set of PMI applies for each precoding matrix of $C_4$ set of precoding matrices. It captures the frequency domain feature and time domain feature of the channel. All precoding matrices share same information indicated by the one set of PMI. It reduces overhead of CSI and the second communication device can get more accurate CSI because the PMI adopts the frequency domain feature and time domain feature of the channel and we propose a model and the PMI just includes some parameters of the model. The present document also reports RI/CQI for multiple time domain units in one CSI-reporting. It allows the second communication device to schedule with high flexibility based on the reported CSI Another solution includes a method of wireless communication (e.g., method 900 depicted in FIG. 9), comprising: receiving (902), by a first communication device from a second communication device, signal transmissions comprising transmissions of a first reference signal and a second reference signal according to a pattern; and transmitting (904), by the first communication device to the second communication device, channel state information according to the first reference signal and the second reference signal.

Figure 6:
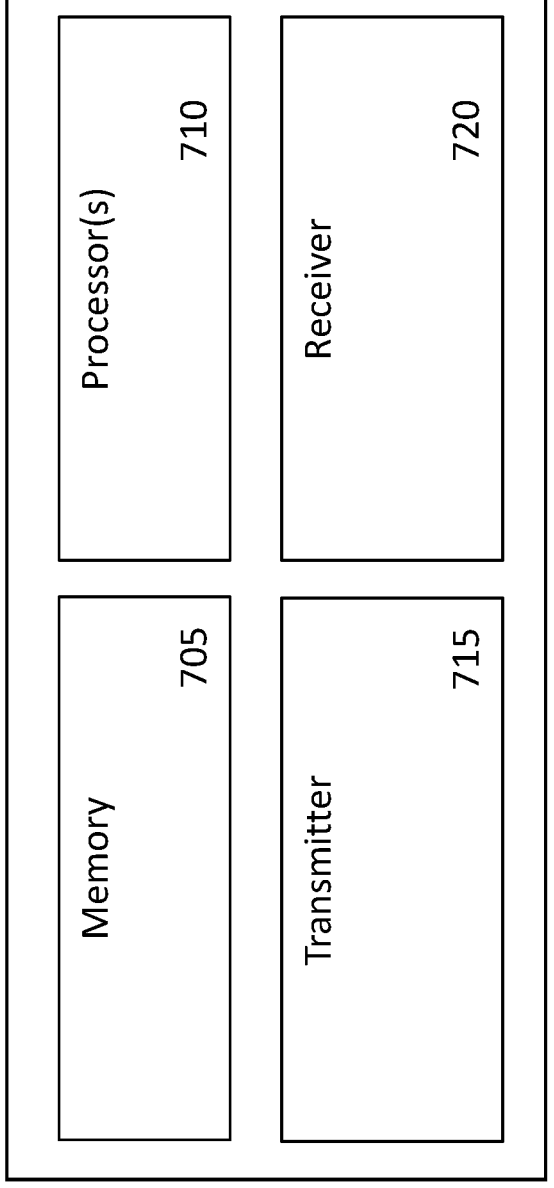
FIG. 6 shows an exemplary block diagram of a hardware platform that may be a part of a network device or a communication device.

FIG. 6 shows an exemplary block diagram of a hardware platform 700 that may be a part of a network device (e.g., base station) or a communication device (e.g., a network node or a user equipment (UE)). The hardware platform 700 includes at least one processor 710 and a memory 705 having instructions stored thereupon. In some embodiments, the memory 705 may be omitted or may be internal to the processor 710. The instructions upon execution by the processor 710 configure the hardware platform 700 to perform the operations described in FIGS. 1 to 8 in the various embodiments described in this patent document. The transmitter 715 transmits or sends information or data to another device. For example, a network device transmitter can send a message to a user equipment. The receiver 720 receives information or data transmitted or sent by another device. For example, a user equipment can receive a message from a network device.

Figure 7:
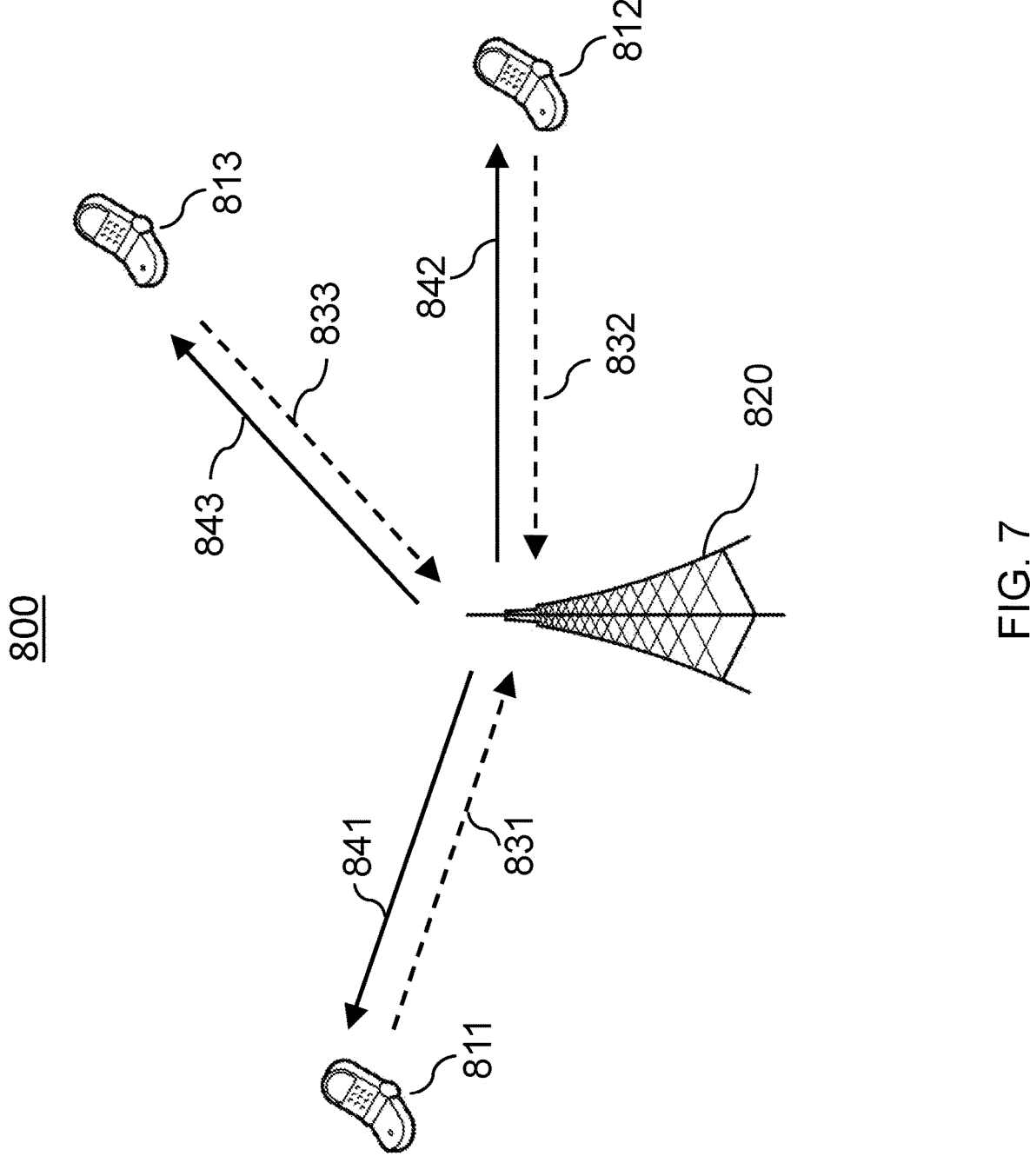
FIG. 7 shows an example of wireless communication network including a base station (BS) and user equipment (UE) based on some implementations of the disclosed technology.

The implementations as discussed above will apply to a wireless communication. FIG. 7 shows an example of a wireless communication system (e.g., a 5G or NR cellular network) that includes a base station 820 and one or more user equipment (UE) 811, 812 and 813. In some embodiments, the UEs access the BS (e.g., the network) using a communication link to the network (sometimes called uplink direction, as depicted by dashed arrows 831, 832, 833), which then enables subsequent communication (e.g., shown in the direction from the network to the UEs, sometimes called downlink direction, shown by arrows 841, 842, 843) from the BS to the UEs. In some embodiments, the BS send information to the UEs (sometimes called downlink direction, as depicted by arrows 841, 842, 843), which then enables subsequent communication (e.g., shown in the direction from the UEs to the BS, sometimes called uplink direction, shown by dashed arrows 831, 832, 833) from the UEs to the BS. The UE may be, for example, a smartphone, a tablet, a mobile computer, a machine to machine (M2M) device, an Internet of Things (IoT) device, and so on.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The invention claimed is:

1. A method of wireless communication, comprising:
   determining, by a first communication device, channel state information CSI corresponding to P Channel State Information Reference Signal (CSI-RS) ports, where P is a positive integer; and
   transmitting, by the first communication device to a second communication device, the CSI;
   wherein the CSI includes one set of a precoding matrix indicator PMI, Q sets of channel quality indicators CQIs, and R values of rank indicator RI,
   wherein the one set of PMI indicates $C_4$ sets of precoding matrices corresponding to $C_4$ first type of time domain units, the Q sets of CQIs corresponds to Q second type of time domain units, the R values of RI corresponds to R third type of time domain units, and
   wherein Q, R, $C_4$ are positive integers,
   wherein at least one of Q, R, $C_4$ is greater than 1, $C_4 \geq Q \geq R$, one of the R third type of time domain units includes one or more second type of time domain units, one of the R third type of time domain unit includes one or more first type of time domain units, one of the Q second type of time domain unit includes one or more of the $C_4$ first type of time domain units, each of the $C_4$ first type of time units corresponds to one or more slots.

2. The method of claim 1, wherein the one set of PMI includes information about one first type of vector set, information about V second type of vector sets, information about D third type of vector sets, index of a strongest coefficient and E coefficients, wherein V is a total number of layers, D and E are positive integers.

3. The method of claim 1, wherein each precoding matrix of the $C_4$ sets of precoding matrices is based on three types of vector sets including a first type of vector set, a second type of vector set and a third type of vector set,
   wherein each of the first type of vector includes P/2 elements, wherein the P/2 elements of one first type of vector have a same amplitude and each of the P/2 elements has a respective phase,
   wherein each of the second type of vector includes $N_3$ elements each of which corresponds to one frequency domain unit k, wherein $k^{th}$ elements of each second type of vector have a format:

$$y_k^{(f)} = e^{j \frac{2 \pi n_3^f k}{N_3}},$$

$n_3^f \in \{0,1, \ldots, N_3-1\}$ wherein f is an index of the corresponding second type of vector that corresponds to one value of $n_3^f$, and
   wherein each of the third type of vector includes $C_4$ elements each of which corresponds to one of the $C_4$ first type of time domain units.

4. The method of claim 1, wherein an $l^{th}$ column $W_{k,t}^l$ of a precoding matrix $W_{k,t}$ of the $C_4$ sets of precoding matrix is specified as $$W_{k,t}^l = \begin{bmatrix} \sum_{i=0}^{L-1} v_i \sum_{f=0}^{M-1} y_{k,l}^{(f)} \sum_{x=0}^{X-1} s_{l,t}^x a_{l,i,f,x} \\ \sum_{i=0}^{L-1} v_i \sum_{f=0}^{M-1} y_{k,l}^{(f)} \sum_{x=0}^{X-1} s_{l,t}^x a_{l,i+L,f,x} \end{bmatrix};$$

wherein $W_{k,t}^l$ is the $l^{th}$ column of the precoding matrix $W_{k,t}$ of a frequency domain unit k, a first type of time domain unit corresponding to t, and a layer l;
   wherein k=0,1, . . . ,$N_3-1$, t=$t_0$,$t_1$, . . . , $t_{C_4-1}$, and l=0,1 . . . , v-1,
   wherein $v_i$, i=$\in \{0,1, \ldots, L-1\}$ is the first type of vector in a first type of vector set, $y_{k,l}^{(f)}$ is $k^{th}$ element of a second type of vector with index f in a second type of vector set, $S_{l,t}^x$ is an element corresponding to t of a third type of vector with index x in a third type of vector set specific to layer l; $a_{l,o,g,j}$ is a value with phase and amplitude, the amplitude of $a_{l,i,f,j}$ is smaller than or equal to 1; t is a time domain index corresponding to one of the $C_4$ first type of time domain units.

5. The method of claim 4, wherein $a_{l,i,f,x} = p_{l,\lfloor i/L \rfloor}^{(1)} p_{l,i,f,x} \varphi_{l,i,f,x}^{(2)}$ wherein $p_{l,\lfloor i/L \rfloor}^{(1)}$ and $p_{l,i,f,x}^{(2)}$ are amplitude coefficients and their phase is 0; $p_{l,\lfloor i/L \rfloor}^{(1)}$ and $p_{l,i,f,x}^{(2)}$ being equal to or larger than 0 and smaller than or equal to 1, $\varphi_{l,i,f,x}$ are phase coefficient and their amplitudes are 1 for l=0,1 . . . , v-1,i=0,1, . . . ,2* L-1, f=0,1, . . . M-1, x=0,1, . . . X-1, and the one set of PMI includes v sets of indexes each of which corresponds to a strongest coefficient $a_{l,i,f,j}$ of the corresponding layer, wherein each of the v sets of indexes includes i* $\in$={0,1, . . . , L-1} and x= $\in$ {0,1, . . . ,X-1}.

6. The method of claim 2, wherein one of the D third type of vector sets is specific to a layer and D equals v, wherein each of the D third type vector sets is used to determine a column of each precoding matrix of the $C_4$ sets of precoding matrix; and
   one third type vector with index x is determined by $f_x$ and a time domain index corresponding to one of the $C_4$ first type of time domain units, wherein a unit of $f^x$ is 1.

7. A method of wireless communications, comprising:
   receiving, from a first communication device by a second communication device, channel state information CSI corresponding to P Channel State Information Reference Signal (CSI-RS) ports, where P is a positive integer; and
   performing, by the second communication device, a communication with the first communication device according to the CSI,
   wherein the CSI includes one set of a precoding matrix indicator PMI, Q sets of channel quality indicators CQIs, and R values of rank indicator RI,
   wherein the one set of PMI indicates $C_4$ sets of precoding matrices corresponding to $C_4$ first type of time domain units, the Q sets of CQIs corresponds to Q second type of time domain units, the R values of RI corresponds to R third type of time domain units, and
   wherein Q, R, $C_4$ are positive integers,
   wherein at least one of Q, R, $C_4$ is greater than 1, $C_4 \geq Q \geq R$, one of the R third type of time domain units includes one or more second type of time domain units, one of the R third type of time domain unit includes one or more first type of time domain units, one of the Q second type of time domain unit includes one or more of the $C_4$ first type of time domain units, each of the $C_4$ first type of time units corresponds to one or more slots.

8. The method of claim 7, wherein the one set of PMI includes information about one first type of vector set, information about V second type of vector sets, information about D third type of vector sets, index of a strongest coefficient and E coefficients, wherein V is a total number of layers, D and E are positive integers.

9. The method of claim 7, wherein each precoding matrix of the $C_4$ sets of precoding matrices is based on three types of vector sets including a first type of vector set, a second type of vector set and a third type of vector set, wherein each of the first type of vector includes P/2 elements, wherein the P/2 elements of one first type of vector have a same amplitude and each of the P/2 elements has a respective phase, wherein each of the second type of vector includes $N_3$ elements each of which corresponds to one frequency domain unit k, wherein $k^{th}$ elements of each second type of vector have a format:

$$y_k^{(f)} = e^{j\frac{2\pi n_3^f k}{N_3}},$$

$n_3^f \in \{0,1, \ldots, N_3-1\}$ wherein f is an index of the corresponding second type of vector that corresponds to one value of $n_3^f$, and wherein each of the third type of vector includes $C_4$ elements each of which corresponds to one of the $C_4$ first type of time domain units.

10. The method of claim 7, wherein an $l^{th}$ column $W_{k,t}^l$ of a precoding matrix $W_{k,t}$ of the $C_4$ sets of precoding matrix is specified as $$W_{k,t}^l = \begin{bmatrix} \sum_{i=0}^{L-1} v_i & \sum_{f=0}^{M-1} y_{k,l}^{(f)} \sum_{x=0}^{X-1} s_t^x a_{l,i,f,x} \\ \sum_{i=0}^{L-1} v_i & \sum_{f=0}^{M-1} y_{k,l}^{(f)} \sum_{x=0}^{X-1} s_t^x a_{l,i+L,f,x} \end{bmatrix};$$

wherein $W_{k,t}$ is the $l^{th}$ column of the precoding matrix $W_{k,t}$ of a frequency domain unit k, a first type of time domain unit corresponding to t, and a layer l;

wherein k=0,1, $N_3-1$ t=$t_0$, ... $t_{C_4-1}$, and l=0,1 ...,v−1;

wherein $v_i, i \in \{0,1, \ldots, L-1\}$ is the first type of vector in a first type of vector set, $y_{k,l}^{(f)}$ is $k^{th}$ element of a second type of vector with index f in a second type of vector set, $S_{l,t}^x$ is an element corresponding to t of a third type of vector with index X in a third type of vector set specific to layer l; $a_{l,i,f,j}$ is a value with phase and amplitude, the amplitude of $a_{l,i,f,j}$ if is smaller than or equal to 1; t is a time domain index corresponding to one of the $C_4$ first type of time domain units.

11. The method of claim 10, wherein $a_{l,i,f,x,} = p_{l,\lfloor i/L\rfloor}^{(1)} p_{l,i,f,x}^{(2)} \varphi_{l,i,f,x}$ wherein $p_{l,\lfloor i/L\rfloor}^{(1)}$ and $p_{l,i,f,x}^{(2)}$ are amplitude coefficients and their phase is 0; $p_{l,\lfloor i/L\rfloor}^{(1)}$ and $p_{l,i,f,x}^{(2)}$ being equal to or larger than 0 and smaller than or equal to 1, $\varphi_{l,i,f,x}$ are phase coefficient and their amplitudes are 1 for l=0,1 ..., v−1,i=0,1, ...,2* L−1, f=0,1, ... M−1, x=0,1, ... X−1, and the one set of PMI includes v sets of indexes each of which corresponds to a strongest coefficient $a_{l,i,f,j}$ of the corresponding layer, wherein each of the v sets of indexes includes i* ∈ {0,1, ..., L−1} and x*={0,1, ... , X−1}.

12. The method of claim 8, wherein one of the D third type of vector sets is specific to a layer and D equals v, wherein each of the D third type vector sets is used to determine a column of each precoding matrix of the $C_4$ sets of precoding matrix; and one third type vector with index x is determined by $f_x'$ and a time domain index corresponding to one of the $C_4$ first type of time domain units, wherein a unit of $f_x$ is 1.

13. A communication device comprising at least one processor that is configured to:

determine channel state information CSI corresponding to P Channel State Information Reference Signal (CSI-RS) ports, where P is a positive integer; and transmit, to a second communication device, the CSI;

wherein the CSI includes one set of a precoding matrix indicator PMI, Q sets of channel quality indicators CQIs, and R values of rank indicator RI, wherein the one set of PMI indicates $C_4$ sets of precoding matrices corresponding to $C_4$ first type of time domain units, the Q sets of CQIs corresponds to Q second type of time domain units, the R values of RI corresponds to R third type of time domain units, and wherein Q, R, $C_4$ are positive integers, wherein at least one of, R, $C_4$ is greater than 1, $C_4 \geq Q \geq R$, one of the R third type of time domain units includes one or more second type of time domain units, one of the R third type of time domain unit includes one or more first type of time domain units, one of the Q second type of time domain unit includes one or more of the C, first type of time domain units, each of the $C_4$ first type of time units corresponds to one or more slots.

14. The communication device of claim 13, wherein the one set of PMI includes information about one first type of vector set, information about v second type of vector sets, information about D third type of vector sets, index of a strongest coefficient and E coefficients, wherein Vis a total number of layers, D and E are positive integers.

15. The communication device of claim 13, wherein each precoding matrix of the $C_4$ sets of precoding matrices is based on three types of vector sets including a first type of vector set, a second type of vector set and a third type of vector set, wherein each of the first type of vector includes P/2 elements, wherein the P/2 elements of one first type of vector have a same amplitude and each of the P/2 elements has a respective phase, wherein each of the second type of vector includes $N_3$ elements each of which corresponds to one frequency domain unit k, wherein $k^{th}$ elements of each second type of vector have a format:

$$y_k^{(f)} = e^{j\frac{2\pi n_3^f k}{N_3}},$$

$n_3^f \in \}0,1, \ldots, N_3-1\}$, wherein f is an index of the corresponding second type of vector that corresponds to one value of nf, and wherein each of the third type of vector includes $C_4$ elements each of which corresponds to one of the $C_4$ first type of time domain units.

16. The communication device of claim 13, wherein an $l^{th}$ column $W_{k,t}^l$ of a precoding matrix $W_{k,t}$ of the $C_4$ sets of precoding matrix is specified as $$W_{k,t}^{l} = \begin{bmatrix} \sum\limits_{i=0}^{L-1} v_i & \sum\limits_{f=0}^{M-1} y_{k,l}^{(f)} \sum\limits_{x=0}^{X-1} s_{l,t}^{x} a_{l,i,f,x} \\ \sum\limits_{i=0}^{L-1} v_i & \sum\limits_{f=0}^{M-1} y_{k,l}^{(f)} \sum\limits_{x=0}^{X-1} s_{l,t}^{x} a_{l,i+L,f,x} \end{bmatrix} ;$$

wherein $W_{k,t}^{l}$ is the $l^{th}$ column of the precoding matrix $W_{k,t}$ of a frequency domain unit k, a first type of time domain unit corresponding to t, and a layer l;

wherein k=0,1, $N_3$−1, t=$t_0$,$t_1$, . . . . , $t_{C_4-1}$, and l=0,1 . . . ,v−1;

wherein $v_i$, i∈={0,1, . . . , L−1} is the first type of vector in a first type of vector set, $y_{k,l}^{(f)}$ is $k^{th}$ element of a second type of vector with index f in a second type of vector set, $S_{l,t}^{x}$ is an element corresponding to t of a third type of vector with index x in a third type of vector set specific to layer l; $a_{l,i,f,j}$ is a value with phase and amplitude, the amplitude of $a_{l,i,f,j}$ is smaller than or equal to 1; t is a time domain index corresponding to one of the $C_4$ first type of time domain units.

17. The communication device of claim 16, wherein $a_{l,i,f,x,t}$=$p_{l\lfloor i/L\rfloor}^{(1)} p_{l,i,f,x}^{(2)} \phi_{l,i,f,x}^{(2)}$ wherein $p_{l\lfloor i/L\rfloor}^{(1)}$ and $p_{l,i,f,x}^{(2)}$ are amplitude coefficients and their phase is 0; $p_{l\lfloor i/L\rfloor}^{(1)}$ and $p_{l,i,f,x}^{(2)}$ being equal to or larger than 0 and smaller than or equal to 1, $\phi_{l,i,f,x}$ are phase coefficient and their amplitudes are 1 for l=0,1 . . . , v−1, i=0,1, . . . ,2* L−1, f=0,1, . . . M−1, x=0,1, . . . X−1, and the one set of PMI includes v sets of indexes each of which corresponds to a strongest coefficient $a_{l,i,f,j}$ of the corresponding layer, wherein each of the v sets of indexes includes i*∈{0,1, . . . , L−1} and x*∈ {0,1, . . . , X−1}.

18. The communication device of claim 14, wherein one of the D third type of vector sets is specific to a layer and D equals v, wherein each of the D third type vector sets is used to determine a column of each precoding matrix of the $C_4$ sets of precoding matrix; and one third type vector with index x is determined by $f_x$' and a time domain index corresponding to one of the $C_4$ first type of time domain units, wherein a unit of $f_x$ is 1.

19. A communication device comprising at least one processor that is configured to:

receive, from a first communication device, channel state information CSI corresponding to P Channel State Information Reference Signal (CSI-RS) ports, where P is a positive integer; and perform a communication with the first communication device according to the CSI, wherein the CSI includes one set of a precoding matrix indicator PMI, Q sets of channel quality indicators CQIs, and R values of rank indicator RI, wherein the one set of PMI indicates $C_4$ sets of precoding matrices corresponding to $C_4$ first type of time domain units, the Q sets of CQIs corresponds to Q second type of time domain units, the R values of RI corresponds to R third type of time domain units, and wherein Q, R, $C_4$ are positive integers, wherein at least one of, R, $C_4$ is greater than 1, $C_4$≥Q≥R, one of the R third type of time domain units includes one or more second type of time domain units, one of the R third type of time domain unit includes one or more first type of time domain units, one of the Q second type of time domain unit includes one or more of the $C_4$ first type of time domain units, each of the $C_4$ first type of time units corresponds to one or more slots.

20. The communication device of claim 19, wherein the one set of PMI includes information about one first type of vector set, information about v second type of vector sets, information about D third type of vector sets, index of a strongest coefficient and E coefficients, wherein v is a total number of layers, D and E are positive integers.

21. The communication device of claim 19, wherein each precoding matrix of the $C_4$ sets of precoding matrices is based on three types of vector sets including a first type of vector set, a second type of vector set and a third type of vector set, wherein each of the first type of vector includes P/2 elements, wherein the P/2 elements of one first type of vector have a same amplitude and each of the P/2 elements has a respective phase, wherein each of the second type of vector includes $N_3$ elements each of which corresponds to one frequency domain unit k, wherein $k^{th}$ elements of each second type of vector have a format:

$$y_k^{(f)} = e^{j \frac{2\pi n_3^f k}{N_3}},$$

$n_3^f$∈{0,1, . . . , $N_3$−1}, wherein f is an index of the corresponding second type of vector that corresponds to one value of $n_3^f$, and wherein each of the third type of vector includes $C_4$ elements each of which corresponds to one of the $C_4$ first type of time domain units.

22. The communication device of claim 19, wherein an $l^{th}$ column $W_{k,t}^{l}$ of a precoding matrix $W_{k,t}$ of the $C_4$ sets of precoding matrix is specified as $$W_{k,t}^{l} = \begin{bmatrix} \sum\limits_{i=0}^{L-1} v_i & \sum\limits_{f=0}^{M-1} y_{k,l}^{(f)} \sum\limits_{x=0}^{X-1} s_{t}^{x} a_{l,i,f,x} \\ \sum\limits_{i=0}^{L-1} v_i & \sum\limits_{f=0}^{M-1} y_{k,l}^{(f)} \sum\limits_{x=0}^{X-1} s_{t}^{x} a_{l,i+L,f,x} \end{bmatrix} ;$$

wherein $W_{k,t}^{l}$ is the $l^{th}$ column of the precoding matrix $W_{k,t}$ of a frequency domain unit k, a first type of time domain unit corresponding to t, and a layer l;

wherein k=0,1, . . . $N_3$−1, t=$t_0$, $t_1$, . . . . , $f_{C_4-1}$ and, l=0,1 . . . ,v−1, wherein $v_i$, i ∈ {0,1, . . . , L−1} is the first type of vector in a first type of vector set, $y_{k,l}^{(f)}$ is $k^{th}$ element of a second type of vector with index f in a second type of vector set, $S_{l,t}^{x}$ is an element corresponding to t of a third type of vector with index x in a third type of vector set specific to layer l; $a_{l,i,f,j}$ is a value with phase and amplitude, the amplitude of $a_{l,i,f,j}$ is smaller than or equal to 1; t is a time domain index corresponding to one of the $C_4$ first type of time domain units.

23. The communication device of claim 22, wherein $a_{l,i,f,x,t}$+$p_{l\lfloor i/L\rfloor}^{(1)} p_{l,i,f,x}^{(2)} \phi_{l,i,f,x}$ wherein $p_{l\lfloor i/L\rfloor}^{(1)}$ and $p_{l,i,f,x}^{(2)}$ are amplitude coefficients and their phase is 0; $p_{l\lfloor i/L\rfloor}^{(1)}$ and $p_{l,i,f,x}^{(2)}$ being equal to or larger than 0 and smaller than or equal to 1, $\phi_{l,i,f,x}$ are phase coefficient and their amplitudes are 1 for l=0,1 . . . , v−1, i=0,1, . . . ,2* L−1, f=0,1, . . . . M−1, x=0,1, . . . X−1, and the one set of PMI includes v sets of indexes each of which corresponds to a strongest coefficient $a_{l,i,f,j}$ of the corresponding layer, wherein each of the v sets of indexes includes i*∈{0,1, . . . , L−1} and x*∈ {0,1, . . . , X−1}.

24. The communication device of claim 20, wherein one of the D third type of vector sets is specific to a layer and D equals v, wherein each of the D third type vector sets is used to determine a column of each precoding matrix of the $C_4$ sets of precoding matrix; and one third type vector with index x is determined by $f_x'$ and a time domain index corresponding to one of the $C_4$ first type of time domain units, a unit of $f_x'$ is 1.

* * * * *